(12) United States Patent
Mizuuchi et al.

(10) Patent No.: US 7,742,221 B2
(45) Date of Patent: Jun. 22, 2010

(54) SHORT-WAVELENGTH LIGHT SOURCE

(75) Inventors: Kiminori Mizuuchi, Osaka (JP);
Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 201 days.

(21) Appl. No.: 11/918,274

(22) PCT Filed: Apr. 11, 2006

(86) PCT No.: PCT/JP2006/307659

§ 371 (c)(1),
(2), (4) Date: Oct. 11, 2007

(87) PCT Pub. No.: WO2006/112303

PCT Pub. Date: Oct. 26, 2006

(65) Prior Publication Data

US 2009/0040596 A1    Feb. 12, 2009

(30) Foreign Application Priority Data

Apr. 14, 2005   (JP) ............................. 2005-116837

(51) Int. Cl.
*G02F 1/37* (2006.01)
*G02F 1/35* (2006.01)
*G02F 2/02* (2006.01)

(52) U.S. Cl. ........................................ 359/328; 372/22

(58) Field of Classification Search ......... 359/326–332; 385/122; 372/21, 22
See application file for complete search history.

(56) References Cited

U.S. PATENT DOCUMENTS 5,357,533 A * 10/1994 Mizuuchi et al. ............... 372/22
5,448,398 A    9/1995 Asakura et al. ............. 359/328
5,619,369 A *  4/1997 Yamamoto et al. .......... 359/332
5,836,073 A * 11/1998 Mizuuchi et al. ............. 29/600
6,008,675 A * 12/1999 Handa ........................ 327/96
6,785,457 B2*  8/2004 Mizuuchi et al. ............ 385/129

FOREIGN PATENT DOCUMENTS

| JP | 6-265951 | 9/1994 |
|---|---|---|
| JP | 11-271823 | 10/1999 |
| JP | 2000-235201 | 8/2000 |
| JP | 2002-174833 | 6/2002 |
| JP | 2002-250948 | 9/2002 |
| JP | 2002-311468 | 10/2002 |
| JP | 2002-350914 | 12/2002 |
| JP | 2002-350915 | 12/2002 |

OTHER PUBLICATIONS

Kurz, J. et al, "Odd waveguide mode quasi-phase matching with angled and staggered gratings," Optics Letters, vol. 27, No. 16, Aug. 15, 2002, pp. 1445-1447.

* cited by examiner

*Primary Examiner*—Daniel Petkovsek
(74) *Attorney, Agent, or Firm*—Steptoe & Johnson LLP

(57) ABSTRACT

A short wavelength light source of the present invention comprises a nonlinear crystal having a periodical polarization reversal structure. The polarization reversal structure of the nonlinear crystal is divided into a plurality of regions and the polarization reversal structure and the optical axis of the fundamental wave are inclined with different angles in the respective regions, so that higher harmonic generated is divided into a plurality of beams. By dividing the higher harmonic component into a plurality of beams, it is possible to reduce the power density of the higher harmonic and generate walk off in the fundamental wave and the higher harmonic, thereby to suppress generation of the sum frequency waves of the fundamental wave and the higher harmonic so as to enhance the tolerance to high output. Therefore, SFG generation is suppressed, and a high output power coherent light source is realized.

15 Claims, 17 Drawing Sheets

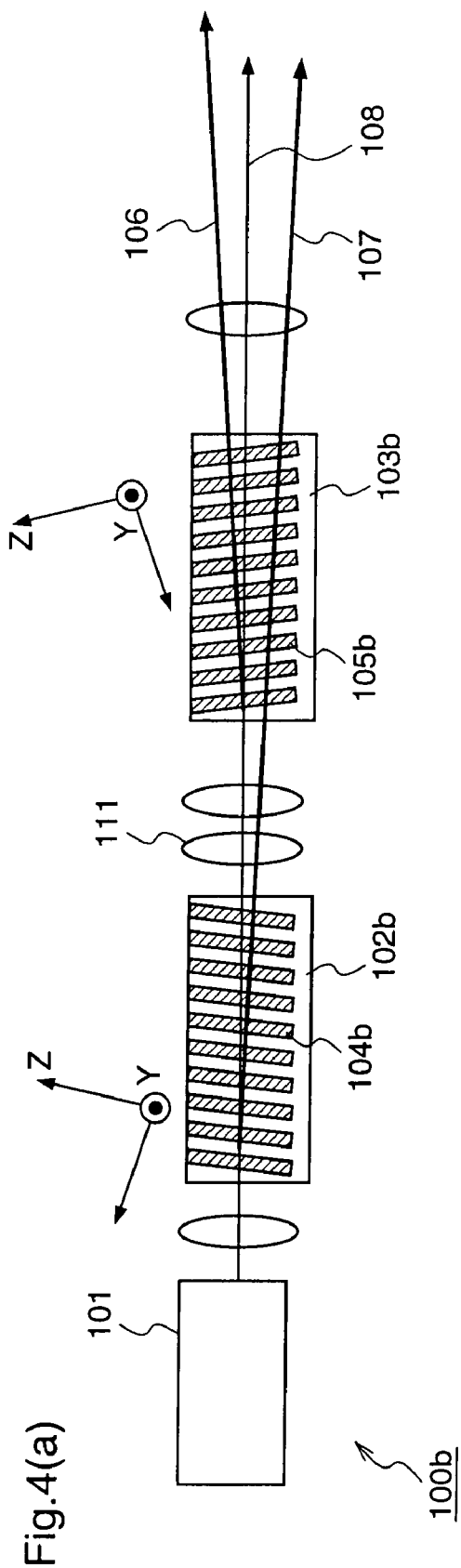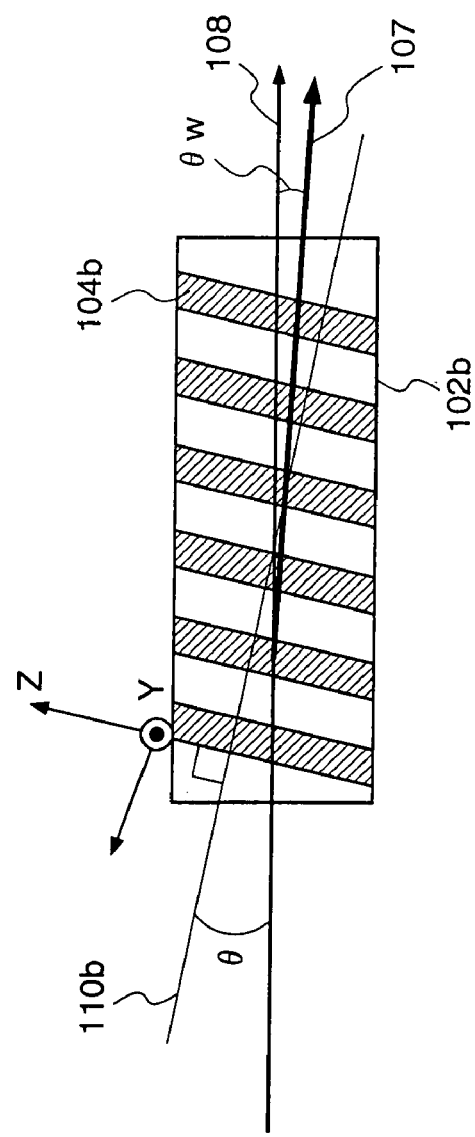
Fig.4(a)
Fig.4(b)

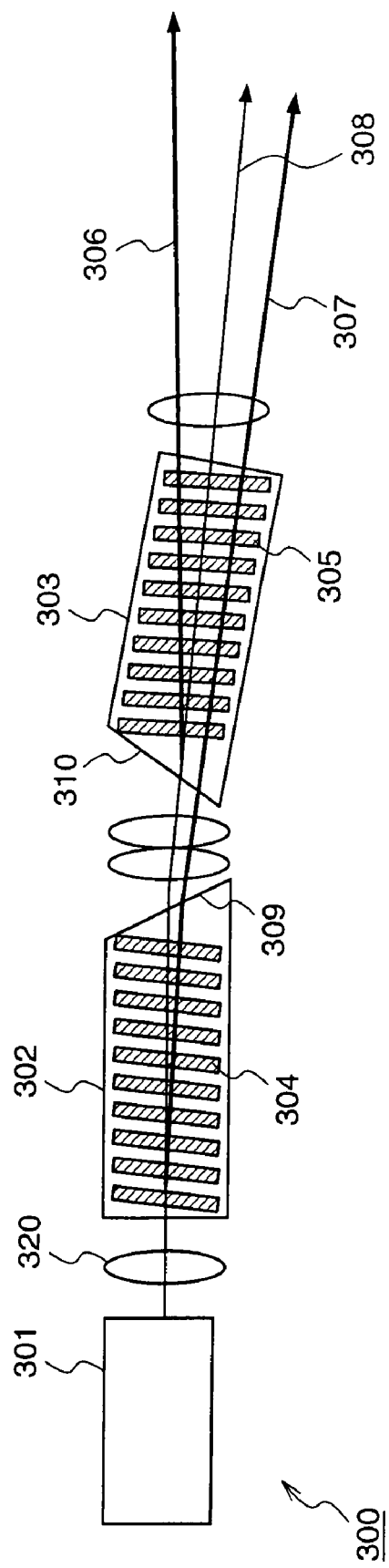

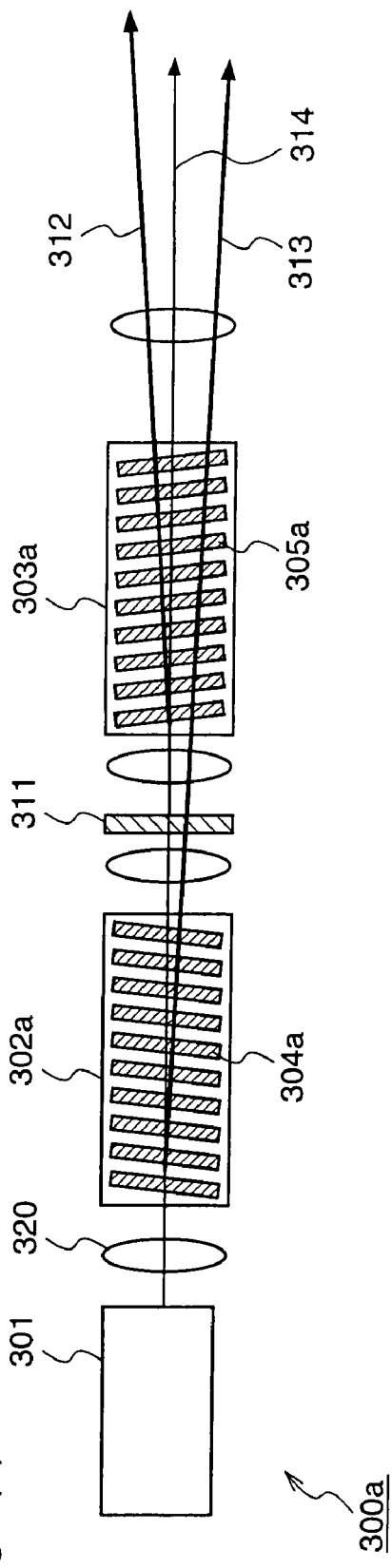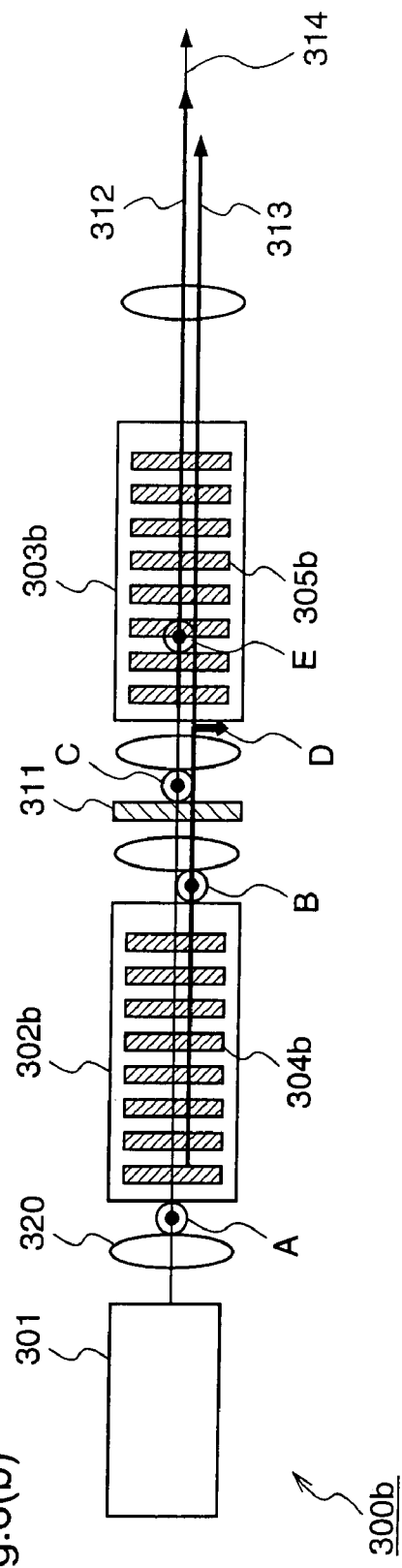

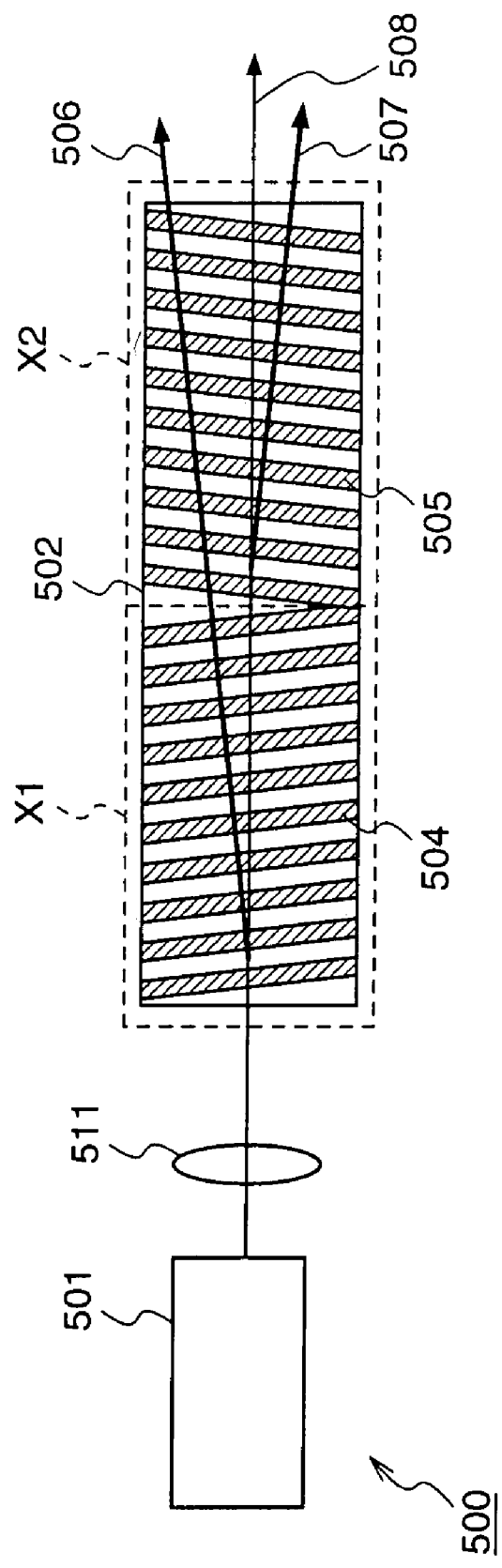

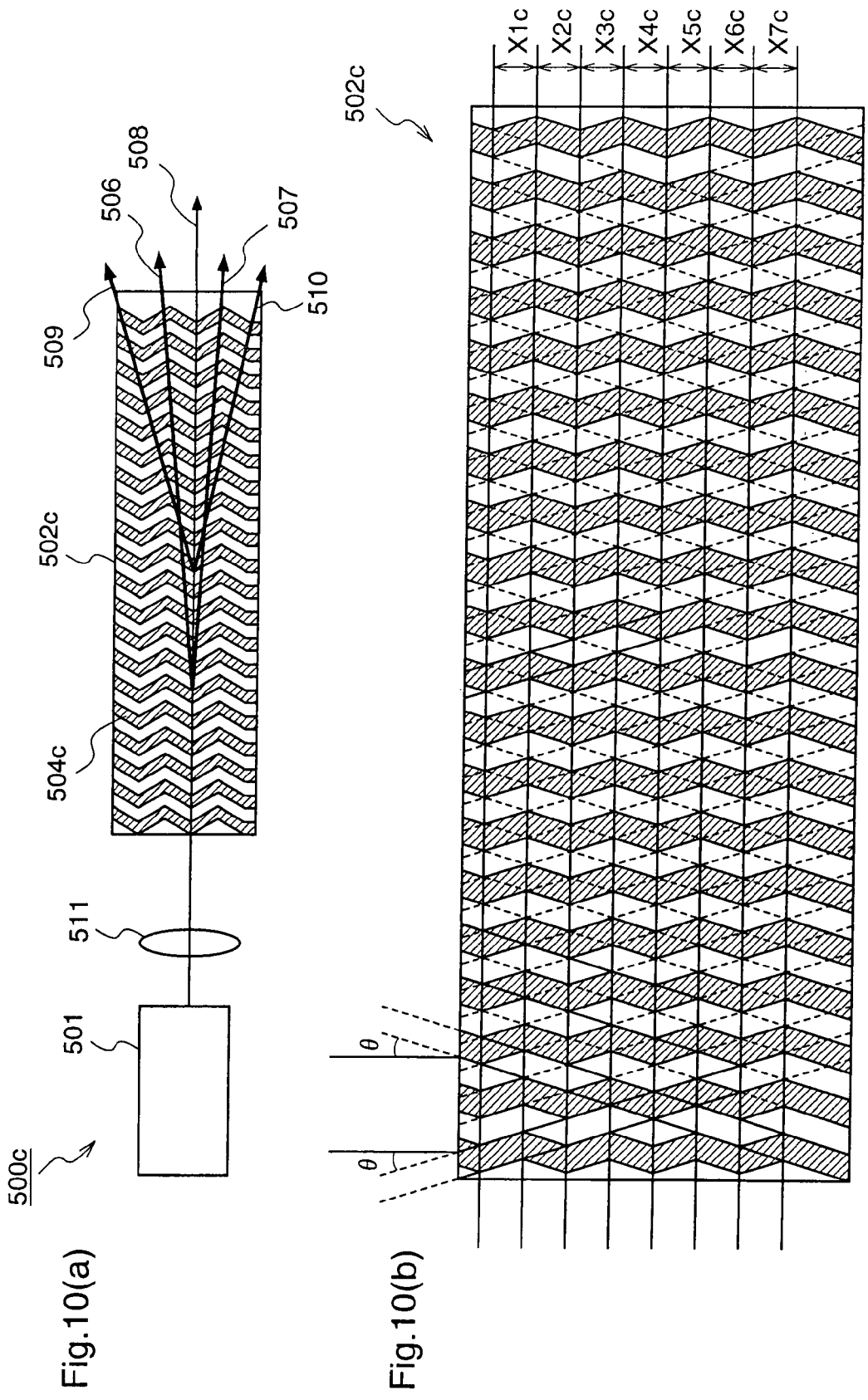

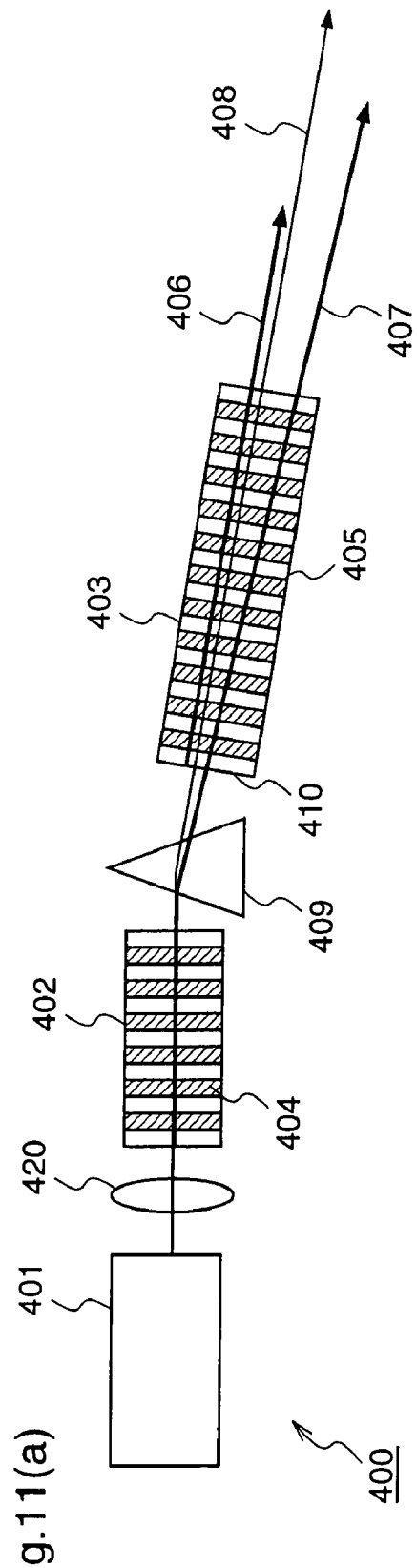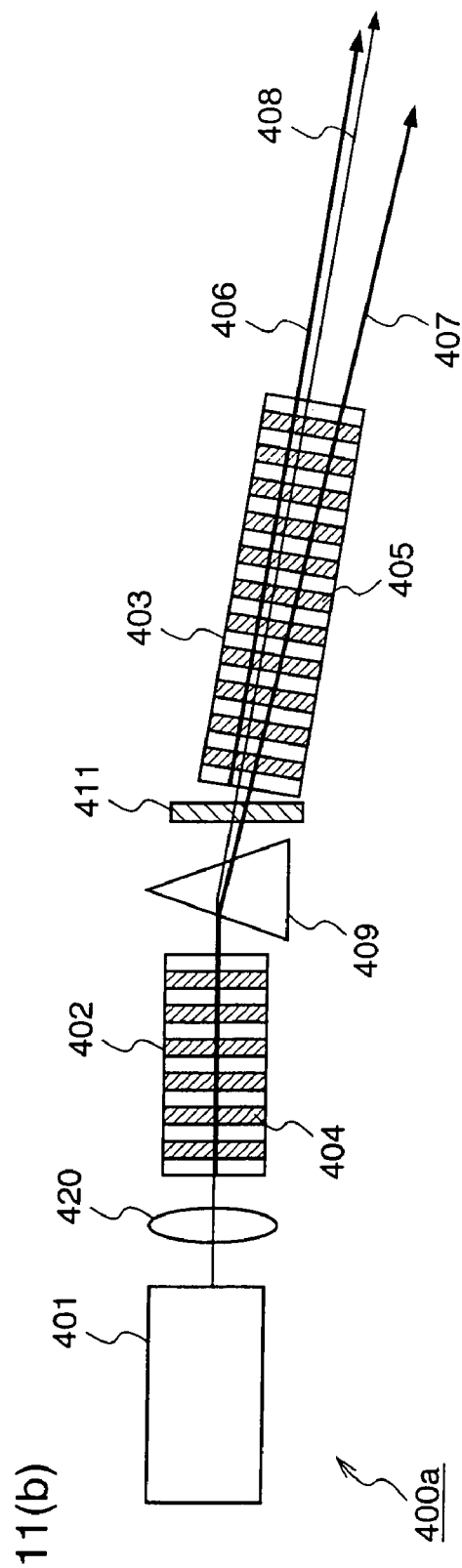

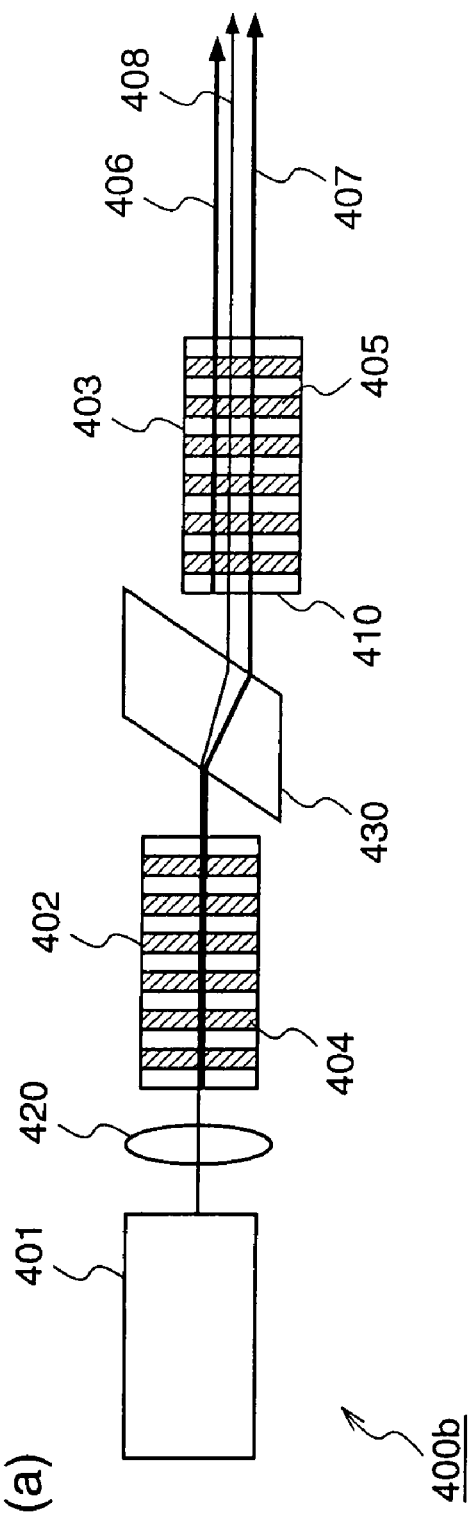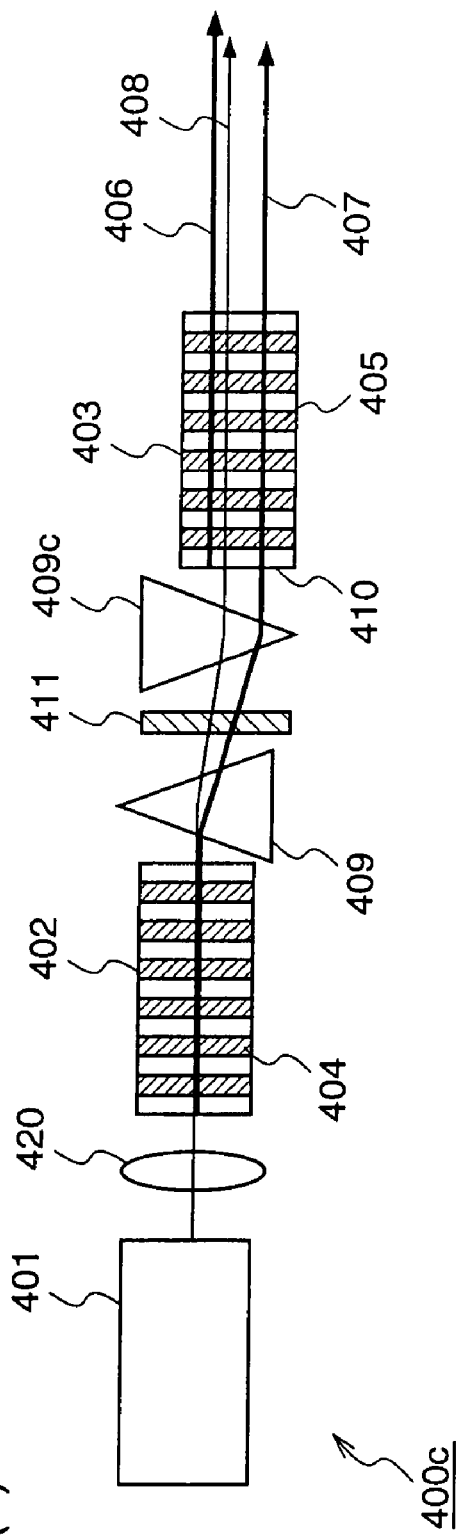

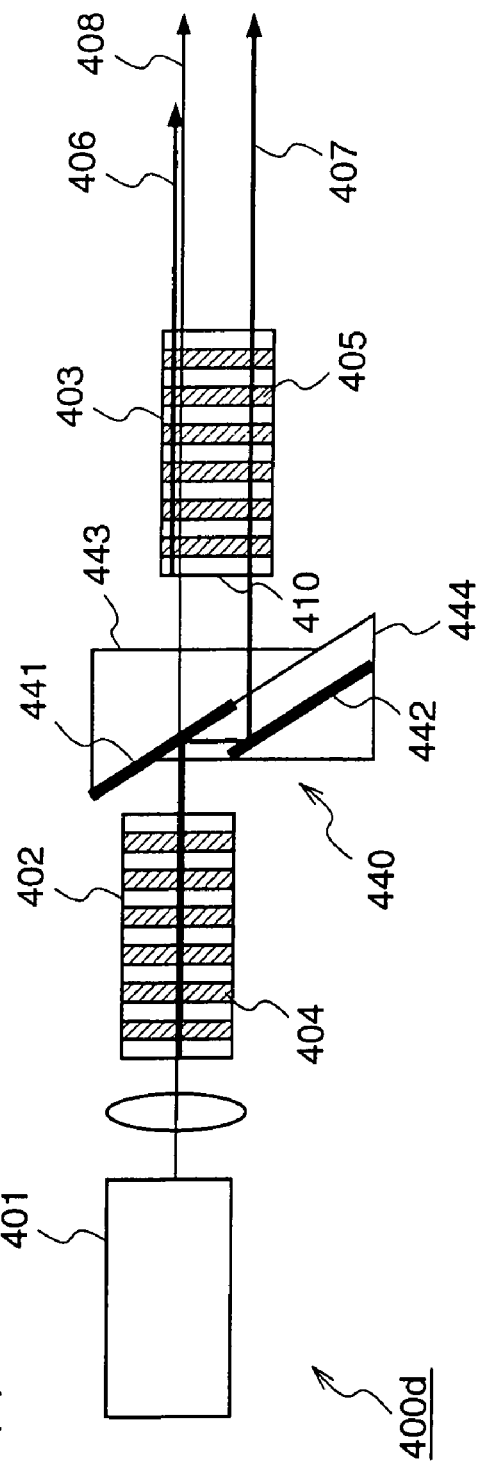
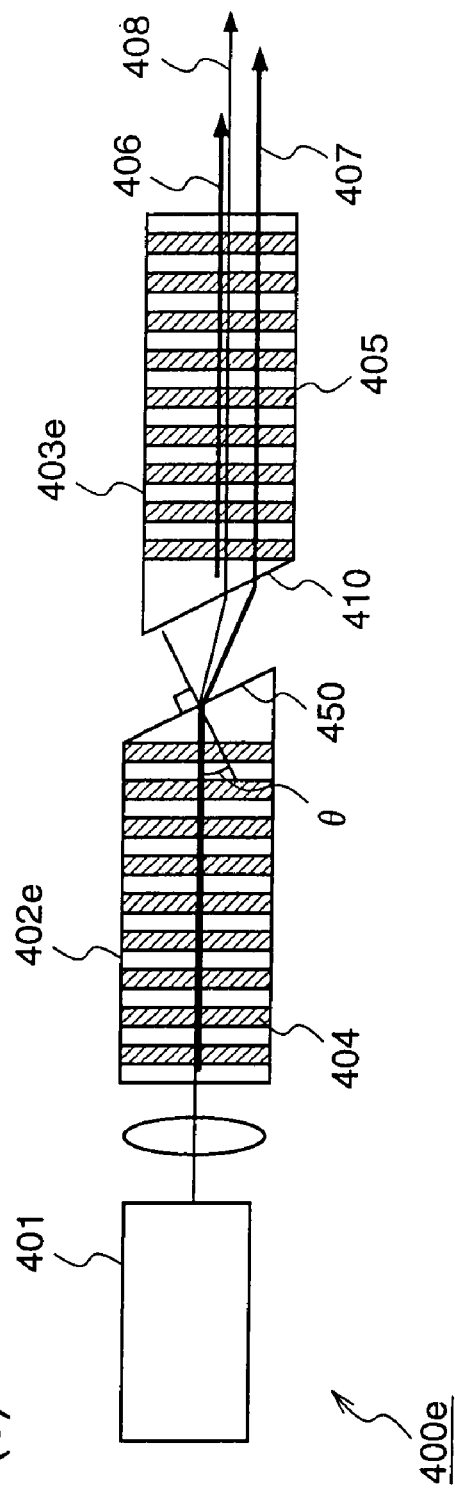

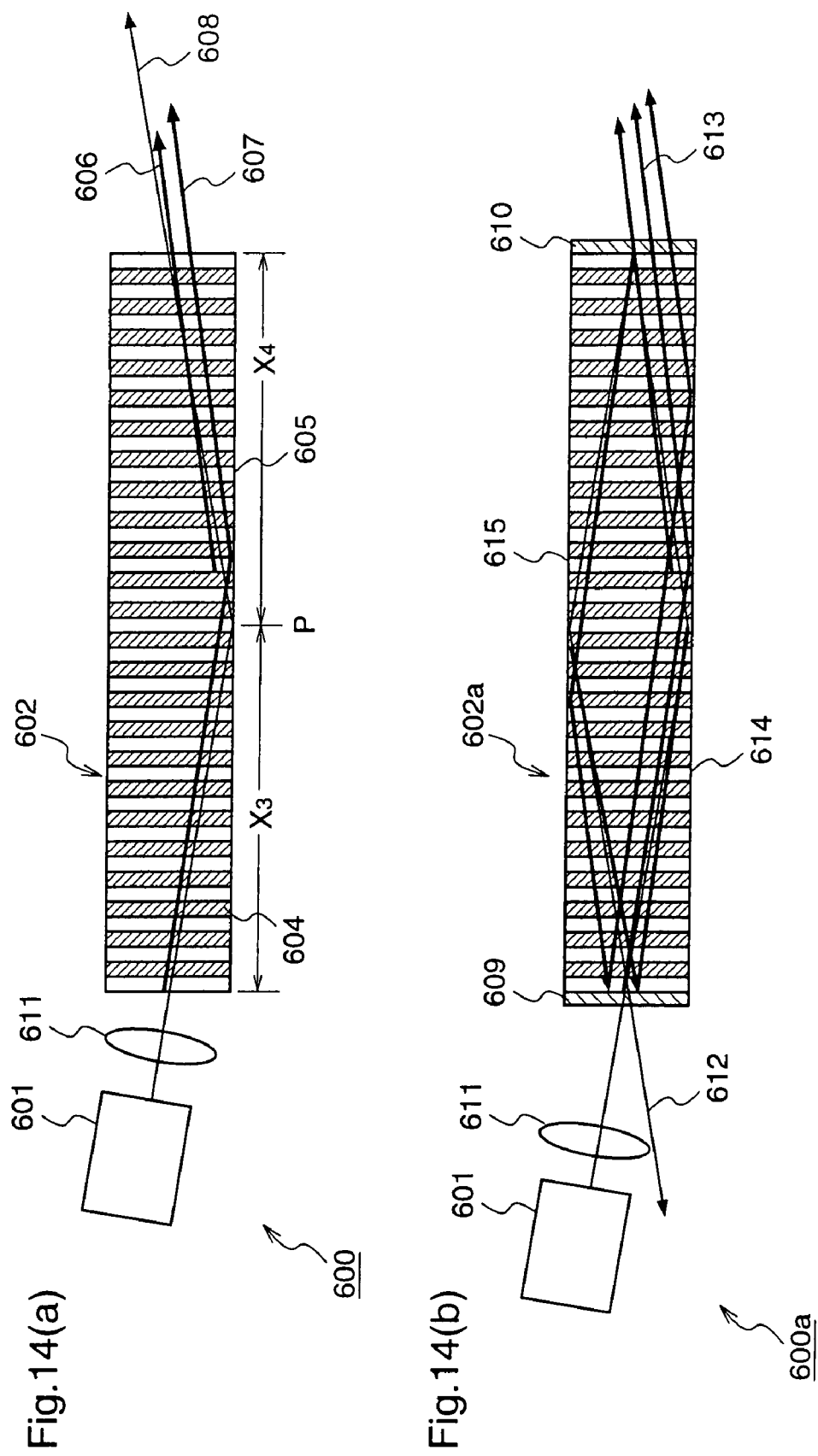

SHORT-WAVELENGTH LIGHT SOURCE

The present application is based on International Application PCT/JP2006/307659, filed Apr. 11, 2006, which claims priority to Japanese Patent Application No. 2005-116837, filed Apr. 14, 2005, the entire contents of which are hereby incorporated by reference.

TECHNICAL FIELD

The present invention relates to a short-wavelength light source using a wavelength conversion element.

BACKGROUND ART

Second higher harmonic generation utilizing nonlinear optical effects can convert coherent light outputted from a fundamental wave light source into a second higher harmonic having a half wavelength. In the wavelength conversion, when phase matching is non-critical, the conversion efficiency is improved by an increase in element length or by an increase in power of an incident fundamental wave. Accordingly, high output power short-wavelength light generation becomes possible. In wavelength conversion using potassium titanate phosphate ($KTiOPO_4$:KTP) as a nonlinear optical crystal, an increase in power density of the fundamental wave or the higher harmonic causes generation of color center that is called as a gray track, thereby resulting in absorption of the fundamental wave or the higher harmonic. When a gray track is generated, heat distribution occurs due to the above absorption and the nonlinear crystal is subjected to destructive damages. As a way to solve this problem, there have been proposed methods for obtaining the second higher harmonic separated from the divided crystal regions as shown in patent document 1.

FIG. 17 is a diagram illustrating a schematic structure of a conventional short wavelength light source.

In FIG. 17, a part of the fundamental wave 1006 that is outputted from a fundamental wave light source 1001 is wavelength converted by a KTP 1002, and is separated into the fundamental wave 1006 and a higher harmonic 1007 by a wavelength separation mirror 1004. Then, a part of the fundamental wave 1006 is again wavelength converted by the KTP 1003, and is separated into the fundamental wave 1006 and a higher harmonic 1008 by a wavelength separation filter 1005.

In this way, a second higher harmonic is taken out by using a plurality of KTP crystals in a state where the power density of the generated second higher harmonic does not exceed a certain value. Thus a higher efficiency is realized. Patent Document 1: Japanese Published Patent Application No. Hei. 11-271823

DISCLOSURE OF THE INVENTION

Problems to be Solved by the Invention

Since the conventional construction requires plural optical crystals, and the second higher harmonics are outputted from different portions, a complicated optical system is required to synthesize these and utilize the result, resulting in an increase in the size of the short wavelength light source.

Further, since the output that can be obtained from a optical crystal is limited in its power, a large number of optical crystals are required to obtain a high output, resulting in difficulty in miniaturization and reduction in cost of the light source at low cost.

The present invention is directed to solving the above described problems and has for its object to provide a highly reliable short wavelength light source having stable output characteristics at high output by using a wavelength conversion element.

Measures to Solve the Problems

In order to solve the above described problems, according to Claim 1 of the present invention, a short wavelength light source comprises a fundamental wave light source for outputting a fundamental wave and a nonlinear optical crystal for converting a part of the fundamental wave into a second higher harmonic, the nonlinear optical crystal having a periodical polarization reversal structure, wherein, the polarization reversal structure of the nonlinear optical crystal is divided into a plurality of polarization reversal regions, and the light path of a generated second higher harmonic or an angle of optical axis of period of the polarization reversal structure is different in the respective polarization reversal regions.

According to Claim 2 of the present invention, a short wavelength light source comprises a fundamental wave light source for outputting a fundamental wave and a nonlinear optical crystal for converting a part of the fundamental wave into a second higher harmonic, the nonlinear optical crystal having a periodical polarization reversal structure, wherein the polarization reversal structure of the nonlinear optical crystal is divided into two polarization reversal regions, and a light polarization plate for rotating the polarization of the second higher harmonic is provided between the two polarization reversal regions.

According to Claim 3 of the present invention, a short wavelength light source comprises a fundamental wave light source for outputting a fundamental wave and a nonlinear optical crystal for converting a part of the fundamental wave into a second higher harmonic, the nonlinear optical crystal having a periodical polarization reversal structure, wherein the fundamental wave reflects off the side face of the nonlinear optical crystal.

According to Claim 4 of the present invention, in the short wavelength light source defined in Claim 1, an angle formed by at least either the optical axis of the fundamental wave or the optical axis of the second higher harmonic and the optical axis of period of the polarization reversal structure is different in the respective polarization reversal regions.

According to Claim 5 of the present invention, in the short wavelength light source defined in Claim 1, the polarization reversal structure is divided into left and right with relative to the optical axis of the fundamental wave.

According to Claim 6 of the present invention, in the short wavelength light source defined in Claim 5, the left and right of the divided polarization reversal structure form a wedge shape together.

According to Claim 7 of the present invention, in the short wavelength light source defined in Claim 5, each of the left and right of the divided polarization reversal structure is curved.

According to Claim 8 of the present invention, in the short wavelength light source defined in Claim 4, the plurality of polarization reversal regions are divided by lines that are parallel to the optical axis of the fundamental wave.

According to Claim 9 of the present invention, in the short wavelength light source defined in Claim 4, the plurality of polarization reversal regions are divided so as to be aligned in order in a direction parallel to the optical axis of the fundamental wave.

According to Claim 10 of the present invention, in the short wavelength light source defined in Claim 4, an angle formed by the optical axis of each polarization reversal structure and the optical axis of the fundamental wave is different in the respective plurality of polarization reversal regions.

According to Claim 11 of the present invention, in the short wavelength light source defined in Claim 4, the nonlinear optical crystal has a side face which is virtually horizontal to the polarization reversal structure, and reflects the fundamental wave by the side face.

According to Claim 12 of the present invention, in the short wavelength light source defined in Claim 3 or 4, there is provided a beam shaping means for, among the fundamental wave and the second higher harmonic that are outputted from the nonlinear optical crystal, reflecting the fundamental wave while transmitting the second higher harmonic to carry out light condensation.

According to Claim 13 of the present invention, in the short wavelength light source defined in Claim 3 or 4, there is provided a diffraction element for generating higher-order diffraction for said second harmonic in the nonlinear optical crystal.

According to Claim 14 of the present invention, in the short wavelength light source defined in Claim 3 or 4, a part of the side face of the nonlinear optical crystal is formed in a tapered shape.

According to Claim 15 of the present invention, in the short wavelength light source defined in Claim 3 or 4, there is provided a light polarization plate for rotating the polarization of the second higher harmonic.

According to Claim 16 of the present invention, in the short wavelength light source defined in Claim 4, the positive and negative of the angle formed by the optical axis of periods of each polarization reversal structure and the optical axis of the fundamental wave are opposite in adjacent regions among the plurality of polarization reversal regions.

According to Claim 17 of the present invention, in the short wavelength light source defined in Claim 4, an angle formed by at least either the optical axis of the fundamental wave or the optical axis of the second higher harmonic and the optical axis of period of the polarization reversal structure is more than 2 degrees.

According to Claim 18 of the present invention, in the short wavelength light source defined in Claim 4, the nonlinear optical crystal is Mg-doped $LiNbO_3$.

According to Claim 19 of the present invention, in the short wavelength light source defined in Claim 3 or 4, there is provided a prism for differentiating refraction angles of the fundamental wave and the second higher harmonic.

According to Claim 20 of the present invention, in the short wavelength light source defined in Claim 3 or 4, there is provided a separation prism for separating the second higher harmonic from the fundamental wave.

According to Claim 21 of the present invention, in the short wavelength light source defined in Claim 3 or 4, at least either the output facet or the incident facet of the nonlinear optical crystal is formed in a tapered shape.

Effects of the Invention

According to the present invention, since the higher harmonic generated is separated into plural beams by using a walk-off angle due to the periodical polarization reversal structure, it is possible to reduce the power density of the higher harmonic, to suppress the generation of the sum frequency waves of the fundamental wave and the higher harmonic, and to reduce the absorption of the higher harmonic. Therefore, the tolerance to high output of a wavelength conversion element is enhanced to a great extent, and a stable and highly reliable short wavelength light source can be realized.

Moreover, since beams generated can be outputted in nearly the same traveling direction, it is possible to synthesize higher harmonics with a simple optical system, thereby being effective in miniaturization of a light source.

Further, according to the light source of the present invention, since higher harmonic generated is divided into plural beams by using a reflection on the side face of the nonlinear optical crystal, it is possible to reduce the power density of the higher harmonic, to suppress the generation of the sum frequency waves due to the fundamental wave and the higher harmonic, and to suppress the absorption of higher harmonic, thereby the tolerance to high output of the wavelength conversion element drastically is enhanced, and a stable and highly reliable short wavelength light source can be realized.

BRIEF DESCRIPTION OF THE DRAWINGS

FIG. 4(a) is a diagram illustrating another constructional example (side view) of the short wavelength light source according to a first embodiment of the present invention, and FIG. 4(b) is a diagram illustrating a partially enlarged view of the wavelength conversion element which constitutes the short wavelength light source.

FIG. 5 is a diagram illustrating one example of a construction of a short wavelength light source according to a second embodiment of the present invention.

FIG. 6(a) is a diagram illustrating one example of a construction of a short wavelength light source according to a third embodiment of the present invention, and FIG. 6(b) is a diagram for illustrating one example of a construction of a short wavelength light source according to a fourth embodiment of the present invention.

FIG. 7 is a diagram illustrating one example of a construction of a short wavelength light source according to a fifth embodiment of the present invention FIG. 10(a) is a diagram illustrating another constructional example of the short wavelength light source according to an eighth embodiment of the present invention, and FIG. 10(b) is a diagram illustrating a partially enlarged view of a wavelength conversion element which constitutes the short wavelength conversion element.

FIG. 11(a) is a diagram for illustrating one example of a construction of a short wavelength light source according to a ninth embodiment of the present invention, and FIG. 11(b) is a diagram illustrating another constructional example of a short wavelength light source according to a ninth embodiment of the present invention.

FIG. 12(a) is a diagram illustrating one example of a construction of a short wavelength light source according to a tenth embodiment of the present invention, and FIG. 12(b) is a diagram illustrating one example of a construction of a short wavelength light source according to an eleventh embodiment of the present invention.

FIG. 13(a) is a diagram illustrating one example of a construction of a short wavelength light source according to a twelfth embodiment of the present invention, and FIG. 13(b) is a diagram illustrating one example of a construction of a short wavelength light source according to a thirteenth embodiment of the present invention.

FIG. 14(a) is a diagram illustrating one example of a construction of a short wavelength light source according to a fourteenth embodiment of the present invention, and FIG. 14(b) is a diagram for illustrating one example of a construction of a short wavelength light source according to a fifteenth embodiment of the present invention.

Figure 1A:
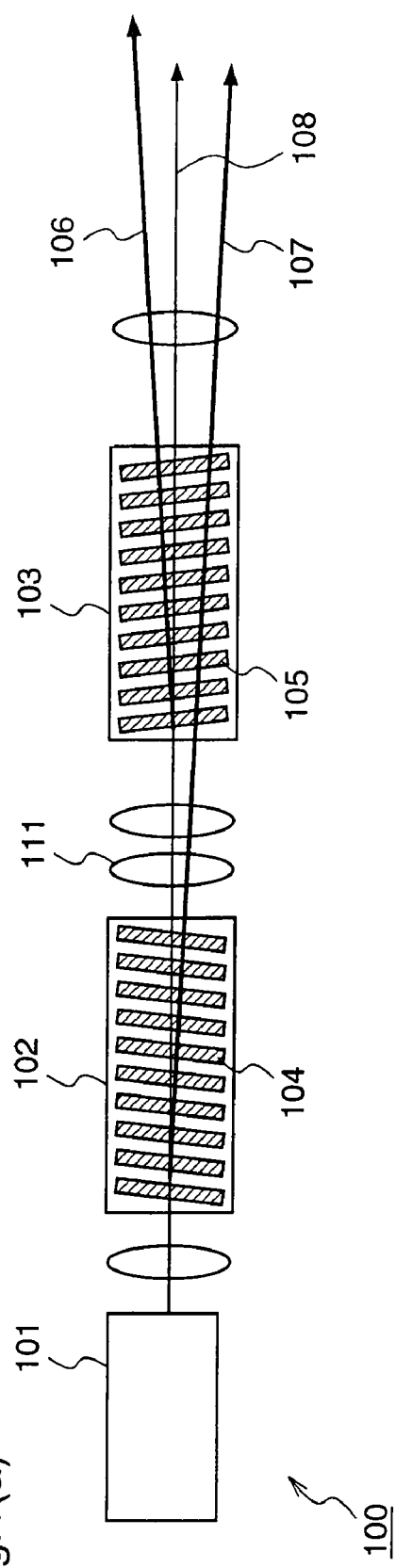
FIG. 1(a) is a diagram illustrating a construction of a short wavelength light source (top view) according to a first embodiment of the present invention.

DESCRIPTION OF THE REFERENCE NUMERALS 101, 301, 401, 501, 601, 701, 801, 1001 ... fundamental wave light source
102, 103, 302, 303, 402, 403, 502, 602, 702, 802 ... wavelength conversion element
104, 105, 109, 304, 305, 404, 405, 504, 505, 604, 704, 804 ... periodical polarization reversal structure
111, 320, 420, 511, 611, 720, 820 ... light collection light source
106, 107, 122, 306, 307, 312, 313, 406, 407, 506, 507, 606, 607, 613, 706, 707, 806, 807, 813, 814, 1007, 1008 ... higher harmonic
108, 308, 314, 408, 508, 608, 612, 708, 808, 1006 ... fundamental wave
509, 510 ... sum frequency wave
110 ... optical axis of the periodical polarization reversal structure
309, 450 ... output facet
310, 410 ... incident facet
311, 411 ... light polarization plate
409 ... prism
430 ... parallel prism
440 ... separation prism
441 ... wavelength separation film
442 ... reflection film
443, 444 ... prism
605, 614, 615, 705, 810, 811 ... side face
609, 610 ... multi layered film reflection mirror
710, 711, 712 ... multi layered film
1002, 1003 ... KTP
1004, 1005 ... wavelength separation mirror

THE BEST MODE TO EXECUTE THE INVENTION

The present invention has for its object to realize a high output short wavelength light source with a wavelength conversion element utilizing a periodical polarization reversal structure.

Generally, a wavelength conversion element utilizing a periodical polarization reversal structure is capable of performing a highly effective wavelength conversion due to its long functional operation length that is realized by a high nonlinear optical constant and a noncritical phase matching condition. Lithium niobate ($LiNbO_3$) doped with Mg or the like which is a wavelength conversion element utilizing such polarization reversal structure is a transparent material which has the highest nonlinear optical constant in a visible region and is superior in optical damage resistance, thereby realizing a highly efficiency conversion. However, even this material is subjected to laser damages which arise from a mechanism that is different from that in potassium titanate phosphate (KTP), and the tolerance to high output is also limited. Accordingly, a short wavelength light source which has a higher tolerance is desired.

The present invention provides a short wavelength light source which can realize a high output as well as miniaturization with adopting a new structure that utilizes a periodical polarization reversal structure.

Here, phenomena which have been discovered in Mg-doped $LiNbO_3$ (hereinafter, referred to as PPMgLN) will be described.

It is discovered that when a second higher harmonic of green light of a wavelength of 532 nm is generated by wavelength conversion of the fundamental wave of a wavelength of 1064 nm by means of PPMgLN, the output becomes unstable if the green light exceeds 3 W, and laser damages are generated in the crystal. When the causes thereof are investigated the following phenomena are formed having caused therein. That is, when a fundamental wave of 1064 nm is converted into a second higher harmonic of 532 nm by PPMgLN, ultraviolet light of 355 nm is generated by the sum frequency wave of the fundamental wave and the second higher harmonic. Since conversion efficiency for the conversion to the light of 355 nm is very low, an amount of light of 355 nm that is generated when high-power wavelength conversion is carried out is minimal. However, when light of 355 nm is generated, absorption of the green light is increased, and the output of higher harmonic becomes unstable due to the thermal lens effect, and when the output power is further enhanced, damages are generated in the crystal. These phenomena form unstable factors during high power output which are different from those occurring in KTP.

Accordingly, the present invention proposes a new structure of a short wavelength light source which can solve the problem of determination in the high-output characteristic that is peculiar to PPMgLN. In PPMgLN, an enhancement in tolerance to high output is required in order to realize a high output of the higher harmonic. Two following methods are effective in enhancing tolerance to high output in PPMgLN;

1) to reduce the power density of the higher harmonic, and
2) to suppress generation of the sum frequency waves of the fundamental wave and the higher harmonic in a crystal.

Hereinafter, embodiments of the present invention will be described.

FIRST EMBODIMENT

Figure 1B:
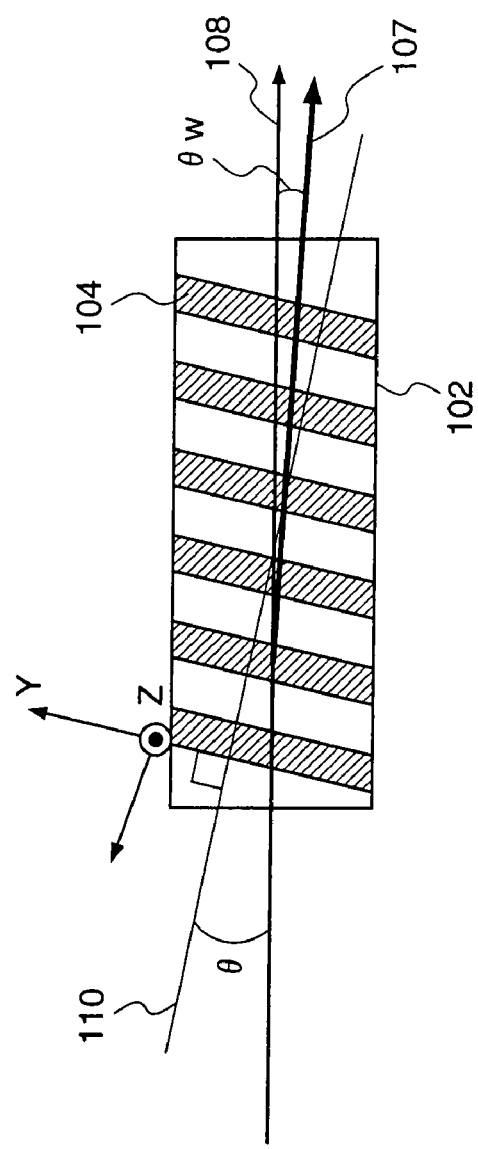
FIG. 1(b) is a diagram illustrating a partially enlarged view of a wavelength conversion element which constitutes the short wavelength light source.

FIG. 1 is a diagram illustrating a construction of a coherent light source according to a first embodiment of the present invention. FIG. 1(a) is a diagram illustrating the overall view of the coherent light source and FIG. 1(b) is a diagram illustrating a partially enlarged view of a wavelength conversion element.

A short wavelength light source 100 shown in FIG. 1(a) comprises a fundamental wave light source 101 for outputting a fundamental wave, wavelength conversion elements 102 and 103 for converting a part of the fundamental wave into a higher harmonic, and a condenser light source 111.

The wavelength conversion elements 102 and 103 respectively have two periodical polarization reversal structures 104 and 105 which are formed inclined with relative to the optical axis of a fundamental wave.

In the short wavelength light source 100 having the construction as described above, a fundamental wave 108 outputted from the fundamental wave light source 101 is partially converted into a higher harmonic 107 by the wavelength conversion element 102, and is further partially converted into a higher harmonic 106 by the wavelength conversion element 103.

Here, a partially enlarged view of the wavelength conversion element 102 illustrated in FIG. 1(a) is shown in FIG. 1(b). It is assumed that the normal to the periodical polarization reversal structure 104 coincide with an optical axis 110 of the periodical polarization reversal structure 104 and that an angle formed by the optical axis 110 and the optical axis of the fundamental wave be a polarization reversal angle θ.

When the polarization reversal angle θ is not 0, there is generated a walk-off angle θw due to dispersion characteristics of the fundamental wave and the second higher harmonic, and thereby there is generated a higher harmonic 107 in a propagation that is direction different from that of the fundamental wave. When different polarization reversal angles θ are formed in the wavelength conversion elements 102 and 103, respectively, as shown in FIG. 1(a), the higher harmonics 106 and 107 are respectively generated in respective wavelength conversion elements 102 and 103 in different optical axis directions, and therefore, it becomes possible to generate plural higher harmonics whose beams do not overlap with each other. As a result, the power densities of the higher harmonics are reduced and the tolerances to high output are enhanced. Further, since the optical axes of the fundamental wave and the higher harmonic are misaligned each other due to the generation of the walk-off angle θw, overlaps of the fundamental wave and the higher harmonics are reduced, thereby the generation of sum frequency waves are further suppressed. Thus, since the walk-off angles of the sum frequency wave and the fundamental wave also increase, it is possible to further suppress the generation of the sum frequency waves. By these three effects, the tolerances to high output are enhanced to a great extent.

What is important have is to suppress the power density of the higher harmonic and the generation of the sum frequency wave in the latter stage wavelength conversion element 103, among the wavelength conversion elements 102 and 103.

If the higher harmonic 107 what is generated in the wavelength conversion element 102 coincides with the higher harmonic 106 that is generated in the wavelength conversion element 103, the power density of the higher harmonic is enhanced, thereby causing damages. Therefore, it is necessary to design the optical axe of the polarization reversal structures so that the beams of higher harmonics which are generated in respective regions do not coincide with each other.

Further, it is necessary to design in such a condition that laser damage due to the generation of the sum frequency waves in the regions of the polarization reversal structures which are divided into plural regions. Since local temperature rise occurs if higher harmonic absorption due to the generation of the sum frequency waves occurs, there is generated a region where the phase matching condition does not stand. This region called as a self phase mismatching region. When a self phase mismatching region is produced due to the generation of the sum frequency waves as described above, the probability that damages enter into the crystals is drastically increased. Further, long-term reliability is also deteriorated. Therefore, it is preferable to set values of higher harmonic output, a walk-off angle, and a phase matching wavelength in respective regions so as not to produce self phase mismatching regions.

To control of generation of self phase mismatching regions is enabled by managing a phase matching temperature. Since partial temperature rise occurs in the crystal when a self phase mismatching region due to a sum frequency wave is generated as described above, it is required to lower the crystal temperature in order to establish a phase matching condition. If a variation that amounts 2° C. or more occurs in the phase matching temperature, at which higher harmonic waves output is 0.5 W or less and almost no sum frequency waves are generated, generation of laser damages due to self phase mismatching becomes eminent. In order to obtain a highly reliable short wavelength light source having a stable output, it is necessary to suppress variations in the phase matching temperature due to the sum frequency waves generated in respective below 2° C. or less. In the present invention, a phase matching temperature is controlled so as not to generate self phase mismatching regions.

The generation of walk-off, as shown in FIG. 1(a), becomes effective by varying angles θ between the optical axis of the higher harmonic and the axis of the polarization reversal structure in adjacent polarization reversal regions (wavelength conversion elements 102 and 103 herein). In particular, reversing the positive and negative of sign of θ in the adjacent regions is more effective. In this case, the positive and the negative of walk-off angles θw of higher harmonics generated in the adjacent regions are reversed, thereby angular misalignment of the higher harmonics becomes larger and overlap of the higher harmonics is further reduced. The angle of the higher harmonic is the angle of the higher harmonics generated in respective regions. Further, in cases where a plurality of polarization reversal regions are connected in series, if the signs of θ are reversed in adjacent regions, overlaps of plural beams generated are reduced without assigning large values to θ, resulting in effectiveness in tolerance to high output. The reason why the value of θ is minimized is because the conversion efficiency itself is lowered if the value of θ is increased, as will be described below.

According to the construction of the present invention, all higher harmonics generated in the plurality of regions are outputted in the same direction. Since higher harmonics generated in each region can be synthesized by utilizing a simple optical system such as a cylindrical lens or the like, the construction of the present invention is effective for miniaturizing and simplifying the light source.

Further, it is effective to use a lens with large chromatic aberration for a condenser optical system (condenser light source) 111. A fundamental wave and a higher harmonic which are both outputted from the wavelength conversion element 102 are collected into the wavelength conversion element 103 by the condenser optical system 111, and when a lens with large chromatic aberration is used in a condenser optical system, the positions for collecting the fundamental wave and the higher harmonic which are collected in the wavelength conversion element 103 can be displaced. Thereby, the overlap of the higher harmonic 107 which is generated by the wavelength conversion element 102 and the higher harmonic 106 which is generated by the wavelength conversion element 106 can be reduced and the tolerance to high output can be enhanced.

Figure 2A:
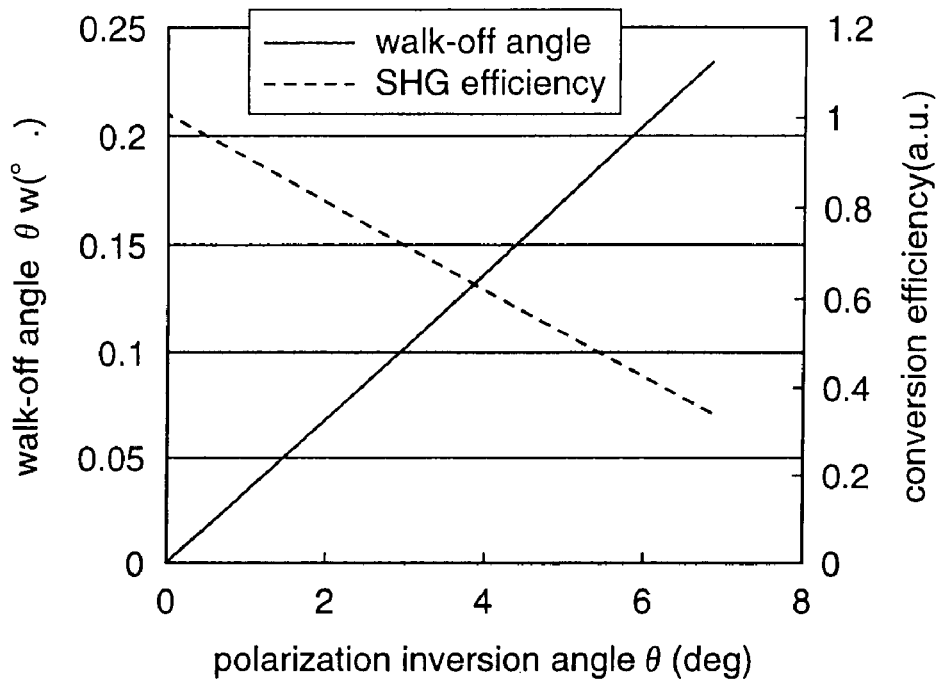
FIG. 2 is a diagram illustrating a characteristic factor of the short wavelength light source of the present invention.

FIG. 2(a) is a diagram illustrating a relationship between a polarization reversal angle θ (angle formed by the polarization reversal structure and the optical axis of a fundamental wave) and a walk-off angle θ.

While the walk-off angle θw increases proportionally to the polarization reversal angle θ, conversion efficiency decreases along with an increase in the polarization reversal angle θ. In order to keep a decrease of the conversion efficiency below 50%, it is desirable that the value of θ is 6 degrees or less.

Figure 2B:
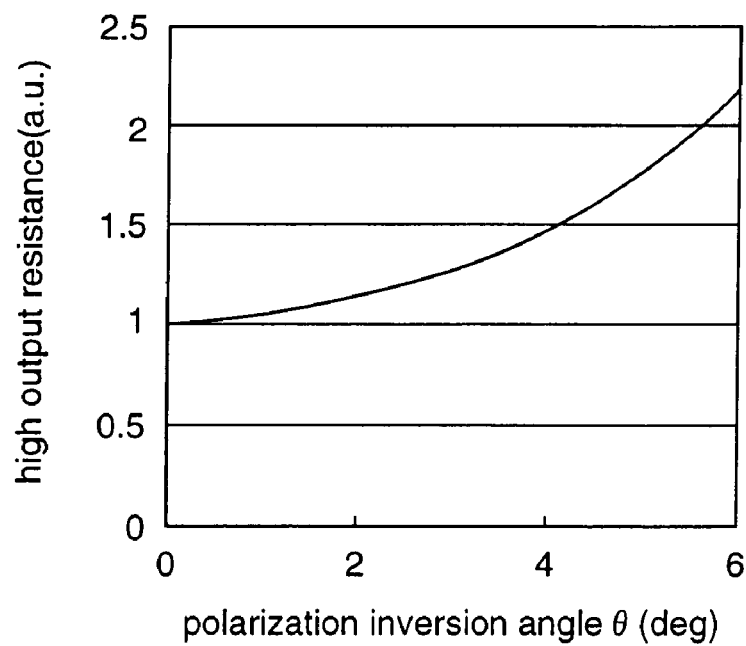

FIG. 2(b) is a diagram illustrating a relationship between the polarization reversal angle θ and tolerance to high output. Tolerance to high output is enhanced along with an increase in the polarization reversal angle θ. That is, an improvement in tolerance to high output can be seen when the value of θ is 1 degree or more, and the tolerance to high output is enhanced to a great extent by assigning the value of θ to be 2 degrees or more. On the other hand, when θ is less than 1 degree, there is almost no effect of tolerance to high output Therefore, it is desirable that the value of θ is 1 degree or more and 6 degrees or less. It is further desirable when the value of θ is 2 degrees or more and 6 degrees or less.

On the other hand, to reduce the overlap of higher harmonics that are generated in plural regions of the polarization reversal structure so as to enhance tolerance to high output, it is effective to provide a space between the regions of the polarization reversal structure (wavelength conversion elements 102 and 103 herein) as shown in FIG. 1(a). Thereby, the effect of the angular misalignment due to a walk-off angle is improved and the overlap reduces. Further, in order to eliminate an overlap of the two beams, when the beam diameter is Φ and the space between two polarization reversal regions is L, it is effective to set respective values that satisfy L*tan(0.34θ)>Φ. Since the higher harmonics generated in respective regions, i.e., in the wavelength conversion elements 102 and 103, do not overlap under this condition, tolerance to high output is enhanced to a great extent.

Figure 3:
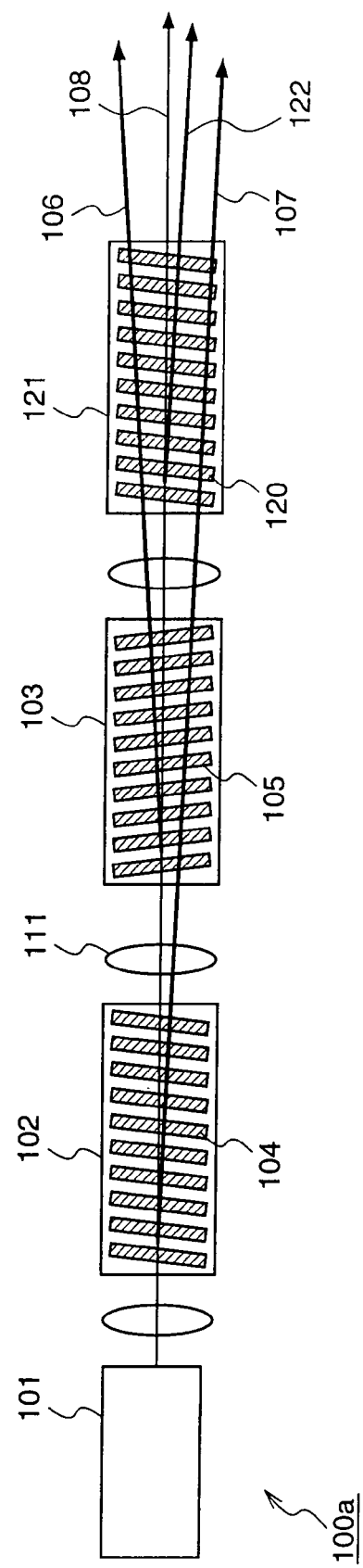
FIG. 3 is a diagram illustrating another constructional example (top view) of the short wavelength light source according to a first embodiment of the present invention.

FIG. 3 is a diagram illustrating one example of a short wavelength light source when a polarization reversal structure is divided into three regions.

A short wavelength light source 100a as shown in FIG. 3 comprises a wavelength conversion element 121 in addition to the construction of the short wavelength light source 100 as shown in FIG. 1.

The wavelength conversion element 121 has a periodical polarization reversal structure 120 which is formed inclined with relative to an optical axis of a fundamental wave, and converts a part of a fundamental wave 108 which is outputted from the wavelength conversion element 103 into a higher harmonic 122.

FIG. 4 is a diagram illustrating one example of another light source when the optical axis is inclined.

A short wavelength light source 100b as shown in FIG. 4(a) is different from the short wavelength light source 100 as shown in FIG. 1(a) in that the Z-axis of the crystal in respective wavelength conversion elements 102b and 103b is different. Since a polarization reversal structure grows in the Z-axis direction from the +Z surface, a polarization reversal crystal has an angle according to the crystal axis. By using the crystals which have different crystal axes between the wavelength conversion elements 102b and 103b, it is possible to make the inclination angles of the polarization reversal different between crystals. In the case of FIG. 1, this can be realized by changing an electrode structure of the +Z surface that forms the polarization reversal structure or by rotating the crystal as shown in FIG. 1(b). Further, it can be realized by combining the structures of FIGS. 1 and 4.

SECOND EMBODIMENT

FIG. 5 is a diagram illustrating a construction of a short wavelength light source according to a second embodiment of the present invention.

A short wavelength light source 300 according to this second embodiment comprises a fundamental light source 301 for outputting a fundamental wave, wavelength conversion elements 302 and 303 for converting a part of the fundamental wave into a higher harmonic, and a condenser light source 320.

The wavelength conversion elements 302 and 303 respectively have periodical polarization reversal structures 304 and 305 which are inclined with relative to the optical axis of a fundamental wave. Here, an output facet 309 of the wavelength conversion element 302 and an incident facet 310 of the wavelength conversion element 303 are formed in a tapered shape. Meanwhile, if the angles of the incident/output facets are set to Brewster's angle, the facet reflection can be reduced.

Next, operations and effects of the second embodiment will be described.

In the short wavelength light source 300 having construction as described above, since the output facet 310 of the wavelength conversion element 303 and the incident facet 310 of the wavelength conversion elements 303 are tapered, light paths of the fundamental wave 308 and the higher harmonic 307 are changed by the prism effect to provide an increased angular difference between the light paths of the two beams. Thereby, the optical axes of the higher harmonics 306 and 307 in the wavelength conversion element 303 are misaligned, and the overlap can be reduced, thereby enhancing the tolerance to high output.

THIRD EMBODIMENT

FIG. 6(a) is a diagram illustrating a construction of a short wavelength light source according to a third embodiment of the present invention.

A short wavelength light source 300a according to this third embodiment comprises a fundamental wave light source 301 for outputting a fundamental wave, wavelength conversion elements 302a and 303a for converting a part of the fundamental wave into a higher harmonic, a condenser light source 320, and a light polarization plate 311.

The wavelength conversion elements 302a and 303a respectively have periodical polarization reversal structures 304a and 305a which are formed inclined with relative to the optical axis of a fundamental wave.

The light polarization plate 311 is disposed between the wavelength conversion elements 302a and 303a. As a characteristic of the light polarization plate 311, it is preferred to provide a the construction that does not rotate a polarization of a fundamental wave while rotates only a polarization.

Next, operations and effects of this third embodiment will be described.

In the short wavelength light source 300a having the construction as described above, since the light polarization plate 311 is inserted between the wavelength conversion elements 302a and 303a, a higher harmonic 313 that is generated in the wavelength conversion element 302a will have a polarization different from that of a fundamental wave 314 in the wavelength conversion element 303a. Since the fundamental wave 314 and the higher harmonic 313 have different polarization directions, the generation of the sum frequency waves in the wavelength conversion element 303a can be suppressed and tolerance to high output can be enhanced to a great extent.

Meanwhile, since the generation of the sum frequency waves becomes the smallest when the polarization of a fundamental wave and the polarization of a higher harmonic are orthogonal to each other, it is preferred to provide, as a characteristic of the light polarization plate 311, a construction that the polarization of a higher harmonic and the polarization of a fundamental wave are orthogonal.

FOURTH EMBODIMENT

FIG. 6(b) is a diagram illustrating a construction of a short wavelength light source according to a fourth embodiment of the present invention.

A short wavelength light source 300b according to this fourth embodiment comprises a fundamental wavelength conversion element 301 for outputting a fundamental wave, wavelength conversion elements 302b and 303b for converting a part of the fundamental wave into a higher harmonic, a condenser light source 320, and a light polarization plate 311.

The wavelength conversion elements 302b and 305b respectively have periodical polarization reversal structures 304b and 305b that are formed to be sequentially aligned in a vertical direction relative to the optical axis of the fundamental wave.

Next, operations and effects of this fourth embodiment will be described.

In the short wavelength light source 300b having the construction as described above, by inserting the light polarization plate 311, a polarization of a higher harmonic 313 that is generated in the wavelength conversion element 302b is in the direction vertical to the paper surface at a point B which is beforehand to the light polarization plate 311, and is rotated in the direction horizontal to the paper surface at a point D which is subsequent to the light, polarization plate 311. Since the polarization of the fundamental wave 314 is not rotated by the light polarization plate 311, it is in the direction vertical to the paper surface at both of point A and point C in front and back of the light polarization plate 311.

Since the fundamental wave 314 and the higher harmonic 313 have the different polarizations in the wavelength conversion element 303b, a nonlinear effect is weakened and no sum frequency wave is generated. To the contrary, while the higher harmonic 312 that is generated in the wavelength conversion element 303b is amplified within the element itself, it does not become high-powered unless it comes to the vicinity of the output facet, and thereby the generation of the sum frequency waves is weak. Therefore, it is possible to suppress the generation of the sum frequency waves due to the higher harmonic 313 in the wavelength conversion element 303b, and further it is possible to suppress the generation of the sum frequency waves due to the simultaneously generated higher harmonic 312, thereby the tolerance to high output is enhanced.

Further, since the polarization directions of the fundamental wave 314 and the higher harmonic 313 are different, the generation of the sum frequency waves in the wavelength conversion element 303b can be suppressed, thereby further enhancing the tolerance to high output.

Meanwhile, since the generation of the sum frequency waves becomes the smallest when the polarization of a fundamental wave and the polarization of a higher harmonic are orthogonal, it is preferred to provide, as a characteristic of the light polarization plate 311, a construction that the polarization of a fundamental wave and the polarization of a higher harmonic are orthogonal. However, it is also effective to provide a construction of only rotating the polarization. Further, the tolerance is further enhanced by misaligning the beam paths of the higher harmonic 313 and the fundamental wave 314 in the wavelength conversion element 304b.

FIFTH EMBODIMENT

FIG. 7 is a diagram for explaining a short wavelength light source according to a fifth embodiment of the present invention.

A short wavelength light source 500 according to this fifth embodiment comprises a fundamental wave light source 501, a wavelength conversion element 502, and a condenser light source 511.

The wavelength conversion element 502 is divided, within a substrate, into two polarization reversal regions X1 and X2 to be sequentially aligned in a direction horizontal to the optical axis of a fundamental wave. A periodical polarization reversal structure 504 in the region X1 and a periodical polarization reversal structure 505 in the region X2 are respectively intersected with the optical axis of a fundamental wave 508 at different polarization reversal angles.

Next, operations and effects of the fifth embodiment will be described.

In the short wavelength light source 500 as described above, since a fundamental wave 506 and a higher harmonic 507 which are generated in the two regions X1 and X2 have different walk-off angles in respective regions, the effective reduction in the power density of a higher harmonic and the effective suppression the generation of the sum frequency waves due to reduction in an overlap of a fundamental wave and a higher harmonic provide a great enhancement in the tolerance to high output. Further, since two polarization reversal regions are formed in a crystal, it is effective for miniaturization. Further, it is also possible to provide a construction of arranging plural regions having different polarization reversal angles θ in a lengthwise direction, and this provide an increase in an interaction length as well as realization of a higher output.

SIXTH EMBODIMENT

Figure 8:
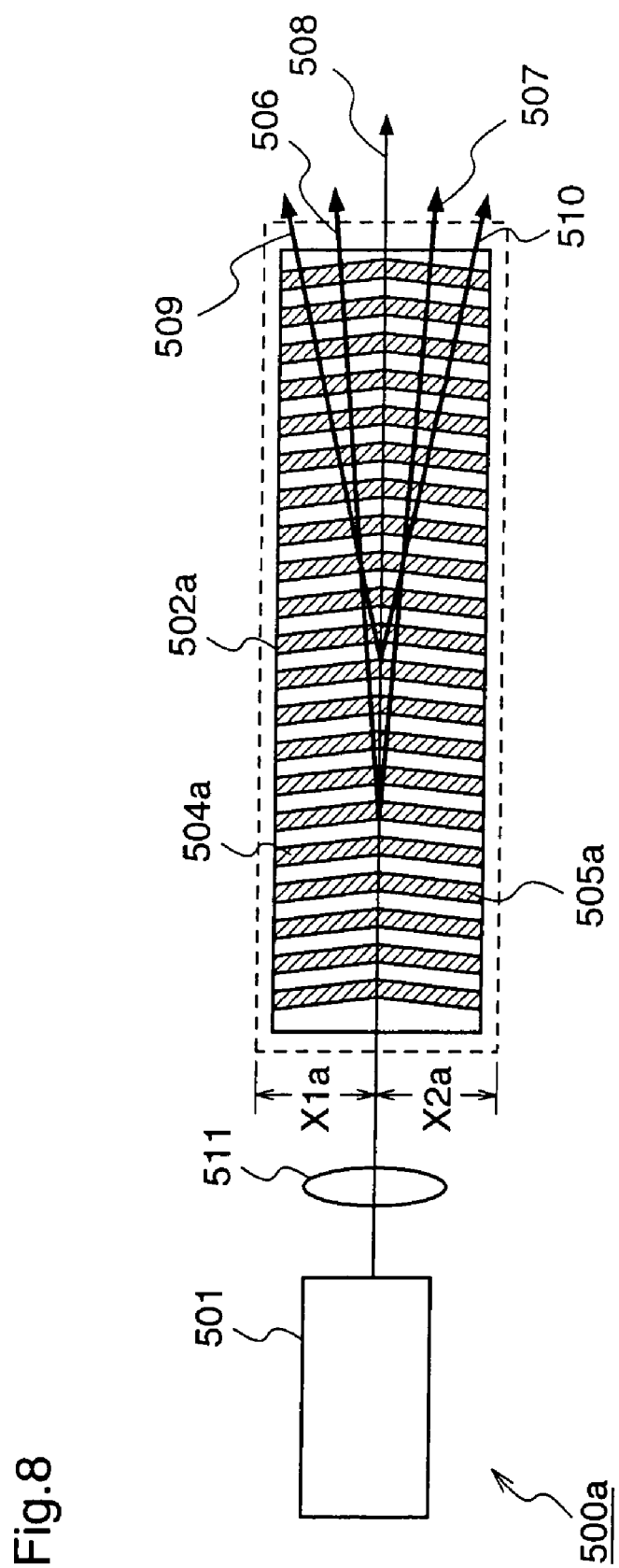
FIG. 8 is a diagram illustrating one example of a construction of a short wavelength light source according to a sixth embodiment of the present invention

FIG. 8 is a diagram illustrating a construction of a short wavelength light source according to a sixth embodiment of the present invention.

A short wavelength light source 500a according to this sixth embodiment comprises, in place of the wavelength conversion element 502 in the short wavelength light source 500 as shown in FIG. 7, a wavelength conversion element 502a having polarization reversal structures which are divided into left and right with relative to the optical axis of a fundamental wave is provided.

It is assumed that respective polarization reversal regions that are provided at left and right with relative to the optical axis of the fundamental wave are region X1a and a region X2a. The region X1a and the region X2a are separated within a beam of a fundamental wave 508.

The polarization reversal structure 504a in the region X1a and the polarization reversal structure 505a in the region X2a form a wedge shape together. Here, when an angle between the optical axis of the polarization reversal structure 504a and the optical axis of the fundamental wave is θ1, it is preferable that the value of θ1 is 1 degree or more and 6 degrees or less, in order to keep a reduction in the conversion efficiency below 50% and enhance the tolerance to high output, as described in the first embodiment. Further, it is desirable that an angle formed by the optical axis of the polarization reversal structure and the optical axis of the fundamental wave is set similarly.

Next, operations and effects of the sixth embodiment will be described.

In the short wavelength light source 500a having the construction as described above, since a fundamental wave 506 and a higher harmonic 507 which are generated in the two regions X1 and X2 have different walk-off angles, the power density of the harmonic is reduced. Further, since the output angles of sum frequencies 509 and 510 are increased due to the inclination angle of the polarization reversal as shown in the figure, the power density of sum frequency wave is reduced, and consequently the tolerance to high output is enhanced.

Meanwhile, it is preferable that a polarization reversal structure for a beam has an angle in a concave shape. It is further preferable that an overlap of the beams of higher harmonics 506 and 507 becomes smaller by making the angle in a concave shaped.

SEVENTH EMBODIMENT

Figure 9:
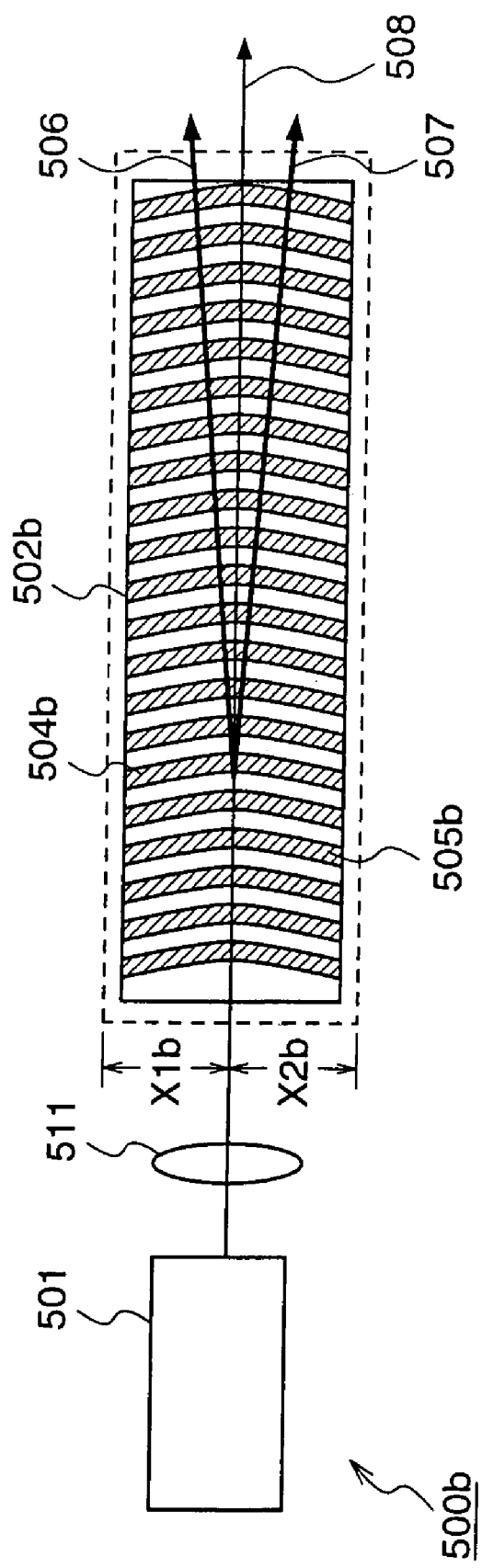
FIG. 9 is a diagram illustrating one example of a construction of a short wavelength light source according to a seventh embodiment of the present invention

FIG. 9 is a diagram illustrating a construction of a short wavelength light source according to a seventh embodiment.

A short wavelength light source 500b according to this seventh embodiment comprises, in place of the wavelength conversion element 502 of the short wavelength light source 500 shown in FIG. 7, a wavelength conversion element 502b having polarization reversal structures which are divided into left and right with relative to the optical axis of a fundamental wave is provided.

It is assumed that the respective polarization reversal regions that are provided at left and right with relative to the optical axis of the fundamental wave is a region X1a and a region X2a. The region X1a and the region X2a are separated within a beam of the fundamental wave 508.

A polarization reversal structure 504b in the region X1a and a polarization reversal structure 505b in the region X2a are curved, and form a wedge shape together. Therefore, the bordering portion of the regions X1b and X2b is enlarged, and adjustment of positions of the two regions may be facilitated. Meanwhile, when an angle between the optical axis of the polarization reversal structure 504b and the optical axis of a fundamental wave is θ2, it is preferable that the value of θ2 is 1 degree or more and 6 degrees or less, in order to keep a reduction in the conversion efficiency below 50% and enhance the tolerance to high output, as explained in the first embodiment. Further, it is preferable that an angle between the optical axis of the polarization reversal structure 505b and the optical axis of a fundamental wave is set similarly.

Next, operations and effects of the seventh embodiment will be explained.

In the short wavelength light source 500b having the construction as described above, since the polarization reversal structures are formed in a curve shape, higher harmonics 506 and 507 that are generated in the wavelength conversion element 502b are separated, and thereby the power density of the higher harmonic is reduced and the tolerance to high output is enhanced.

EIGHTH EMBODIMENT

FIG. 10 is a diagram illustrating a construction of a short wavelength light source according to an eighth embodiment of the present invention. FIG. 10(a) is a diagram illustrating the construction of the short wavelength light source according to this eighth embodiment, and FIG. 10(b) is a diagram illustrating a partially enlarged view of a wavelength conversion element constituting the short wavelength light source.

A short wavelength light source 500c according to this eighth embodiment comprises, in place of the wavelength conversion element 502 in the short wavelength light source 500 shown in FIG. 7, a wavelength conversion element 502c having a polarization reversal structure 504c that is divided into a plurality of regions X1c to X7c by lines parallel to the optical axis of a higher harmonic.

In the polarization reversal structure 504c as shown in FIG. 10, an angle formed by the optical axis of each polarization reversal structure and the optical axis of the fundamental wave is different in each adjacent region among the plural regions divided by lines that are parallel to the optical axis of the fundamental wave. Here, it is preferable that an angle between the optical axis of respective polarization reversal structure 504c and the optical axis of the fundamental wave is 1 degree or more and 6 degrees or less, in order to keep a reduction in the conversion efficiency below 50% and enhance the tolerance to high output, as explained in the first embodiment.

The short wavelength light source 500c having the construction as described above is effective when a cross section region of beam is 100 μm or more. High power output may be obtained by enlarging a cross-section region of a fundamental wave. For example, when wavelength converting a Q-switch driven fundamental wave having a high peak power, the light source is constructed so as to convert the fundamental wave in a state of parallel light without condensing the fundamental wave to reduce the power density of the fundamental wave. In this case, since the beam diameter is 100 μm or more, by dividing the polarization reversal structure into a plurality of regions as shown in FIG. 10(b) to provide an angle, the generation of the higher harmonic is dispersed into plural beams thereby enhancing the tolerance to high output.

NINTH EMBODIMENT

FIG. 11(a) is a diagram illustrating a construction of a short wavelength light source according to a ninth embodiment of the present invention.

A short wavelength light source 400 according to this ninth embodiment comprises a fundamental light source 401, wavelength conversion elements 402 and 403, a condenser light source 420, and a prism 409.

The wavelength conversion elements 402 and 403 respectively have periodical polarization reversal structures 404 and 405 that are formed inclined with relative to the optical axis of a fundamental wave.

The prism 409 is positioned between the wavelength conversion elements 402 and 403.

Next, operations and effects of this ninth embodiment will be described.

According to the short wavelength light source 400 having the construction as described above, refractive indexes of a fundamental wave 408 and a higher harmonic 407 which are outputted from the wavelength conversion element 402 can be changed by the dispersion characteristic of the prism. Accordingly, in the wavelength conversion element 403, the higher harmonic 407 which is outputted from the wavelength conversion element 402 and a higher harmonic 406 that is generated in the wavelength conversion element 403 can be separated thereby enhancing the tolerance to high output Further, the short wavelength light source 400 may further comprise a light polarization plate. FIG. 11(b) is a diagram illustrating a construction of a short wavelength light source when comprising a light polarization plate.

A short wavelength light source 400a as shown in FIG. 11(b) further comprises a light polarization plate 411 subsequent to the prism 409.

According to the short wavelength light source 400a having the construction as described above, since a polarization of the higher harmonic 407 that is generated in the wavelength conversion element 402 can be rotated by the light polarization plate 411, the generation of the sum frequency waves due to the higher harmonic 407 and the fundamental wave 408 can be suppressed within the wavelength conversion element 403 thereby enhancing the tolerance to high output

TENTH EMBODIMENT

FIG. 12(a) is a diagram illustrating a construction of a short wavelength source according to a tenth embodiment of the present invention.

A short wavelength light source 400b according to this tenth embodiment comprises, in place of the prism 409 in the short wavelength light source 400 as shown in FIG. 11(a), a parallel prism 430.

Next, operations and effects of this tenth embodiment will be described.

In the short wavelength light source 400b having the construction as described above, by using the parallel prism 430, it is possible to convert light paths of the fundamental wave 408 and the higher harmonic 407 which are outputted from the wavelength conversion element 402 into different parallel lights. Therefore, the higher harmonic 407 that is generated in the wavelength conversion element 402 and the higher harmonic 406 that is generated in the wavelength conversion element 403 can be taken out as near parallel lights, thereby the optical system for synthesizing two lights is simplified.

Meanwhile, a case where a fundamental wave and a higher harmonic are separated into different light paths by using a parallel prism is described in this tenth embodiment, a prism with large wavelength dispersion may be used by utilizing a difference in wavelengths of the fundamental wave and the higher harmonic. In this case, a fundamental wave and a higher harmonic can be separated by a difference in the refraction angles.

ELEVENTH EMBODIMENT

FIG. 12(b) is a diagram illustrating a construction of a short wavelength light source according to an eleventh embodiment of the present invention.

A short wavelength light source 400c according to this eleventh embodiment comprises, in place of the parallel prism 430, a prism pair comprising prisms 409 and 409c.

Furthermore, the short wavelength light source 400c further comprises a light polarization plate 411 between the prism pair.

Next, operations and effects of the eleventh embodiment will be described.

In the short wavelength light source 400c according to this eleventh embodiment, by using the prism pair, it is possible to change light paths of a fundamental wave 408 and a higher harmonic 407 which are outputted from the wavelength conversion element 402 into different parallel lights as similarly to the parallel prism 430 used in the tenth embodiment. Thereby, since the higher harmonic 407 that is generated in the wavelength conversion element 402 and the higher harmonic 406 that is generated in the wavelength conversion element 403 can be taken out as approximately parallel lights, an optical system for synthesizing two lights is simplified.

Further, in the short wavelength light source 400c, since the light polarization plate 411 is disposed between the prism pair, the polarization of the higher harmonics 406 and 407 can be changed into the different polarizations, and it becomes possible to enhance the tolerance to high output by suppressing the generation of the sum frequency waves.

Meanwhile, a case where the prism pair is used is described in this eleventh embodiment, an optical system having a large refraction dispersion may be used. In this case, since the fundamental wave 408 and the higher harmonic 407 that are generated in the wavelength conversion element 402 can be separated by the wavelength conversion element 403, it is possible to enhance the tolerance to high output. In particular, it is possible to suppress the generation of the sum frequency waves in the wavelength conversion element 403 by separating the fundamental wave 408 and the higher harmonic 407 that are generated in the wavelength conversion element 402 by the wavelength conversion element 403. For example, as an optical system having a large refractive dispersion, a lens made from optical glass having large refractive dispersion is also effective, other than the prism shown in FIG. 11. When the fundamental wave 408 that is generated in the wavelength conversion element 402 is collected by the wavelength conversion element 403, it is possible to drastically reduce the sum frequency wave which is highly efficiently generated at a focusing spot having high power density by misaligning focusing spots of the fundamental wave 408 and the higher harmonic 407. Misalignment of focusing spots is caused by that the refractivity of a lens varies in accordance with a difference in wavelengths of a fundamental wave and a higher harmonic, and it is preferable that the misalignment of focusing spots is larger than the focus depth at the focusing spot. In addition, it is effective to separate a fundamental wave and a higher harmonic by a grating element. Further, a grating lens or the like whose surface is provided with coating is also effective because it can form a lens having large wavelength dispersion.

TWELFTH EMBODIMENT

FIG. 13(a) is a diagram illustrating a short wavelength light source according to a twelfth embodiment of the present invention.

A short wavelength light source 400d according to this twelfth embodiment comprises, in place of the parallel prism 403 in the short wavelength light source 400b shown in FIG. 12(a), a separation prism 440 for separating a fundamental wave and a higher harmonic.

The separation prism 440 which comprises two prisms 443 and 444, and a wavelength separation film 441 is formed on the surface of the prism 443, and a reflection film 442 is formed on a part of the prism 444.

Next, operations and effects of the twelfth embodiment will be explained.

In the short wavelength light source 400d having the construction as described above, the fundamental wave 408 and the higher harmonic 407 which are outputted from the wavelength conversion element 402 are separated by the separation prism 440. That is, the fundamental wave 408 passes through the wavelength separation film 441 of the separation prism 440 and the higher harmonic 407 is reflected by the wavelength separation film 441.

The higher harmonic 407 that is reflected by the wavelength separation film 441 is reflected by the reflection film 442, and enters the wavelength conversion element 403. On the other hand, the fundamental wave 408 that has passed through the wavelength conversion film 441 enters the wavelength conversion element 403, and a part thereof is converted into the higher harmonic 406 in the wavelength conversion element 403.

In this way, the fundamental wave 408 and the harmonic 407 are separated in the wavelength conversion element 403, thereby it is possible to suppress the generation of the sum frequency waves in the wavelength conversion elements 402 and 403, and enhance the tolerance to high output of the wavelength conversion element to a great extent.

In the eighth to twelfth embodiments, while it is explained that the higher harmonic 407 that is generated by the wavelength conversion element 402 is separated from the fundamental wave 408 by using the prism, the facet which is formed in a tapered shape by forming the incident facet or output facet of the wavelength conversion element can be available as a prism.

In a short wavelength light source 400e as shown in FIG. 13(b), an output facet 450 of a wavelength conversion element 402e has an angle with relative to the beam of the fundamental wave. By forming the output facet 450 in a tapered shape, output angles of the fundamental wave 408 and the higher harmonic 407 are varied by a difference in the refraction due to the wavelength difference, and by using this, it becomes possible to separate the fundamental wave 408 and the higher harmonic 407.

For example, if an angle between the light path of the fundamental wave 408 and the vertical line of the output facet 450 in the wavelength conversion element 402e is θ, when θ is 65 degrees, a distance between the wavelength conversion elements 402e and 403e becomes 1 mm, and the light path of the fundamental wave 408 having a beam diameter of about 100 μm and the light path of the higher harmonic 407 will be separated in the wavelength conversion element 403e Thereby, the generation of the sum frequency waves can be suppressed and the tolerance to high output can be enhanced to a great extent. It is preferable that a value of θ is 10 degrees or more so as to output the fundamental wave and the higher harmonic at different angles from the output facet 450. Further, since a higher harmonic is totally reflected when the angle is large, it is preferable that θ is 30 degrees or less. Further, if Brester's angle is set, it is more preferable since reflection loss at the facet disappears without providing a non-reflective coating. Further, when an angle of the incident facet 410 of the wavelength conversion element 403 e is set to have the same angle as the output facet 450, the higher harmonic 407 generated in the wavelength conversion element 403 e and the higher harmonic 408 generated in the wavelength conversion element 403 e become parallel, thereby the optical system for synthesizing outputted lights is simplified. Further, by inserting a lens optical system between the two wavelength conversion elements 402 e and 403 e to collect a fundamental wave again in the wavelength conversion element 403 e, the conversion efficiency can be improved.

Meanwhile, although a case where light paths of a fundamental wave and a higher harmonic are different with relative to the optical axis of period of the polarization reversal structure is described in the first to twelfth embodiments, either of a fundamental wave and a higher harmonic may be different from the optical axis of period of the polarization reversal structure.

Further, although in the first to twelfth embodiments, a case where Mg-doped $LiNbO_3$ is used as a nonlinear material having a periodical polarization reversal structure is described, non-doped $LiNbO_3$, Zn, In, and Sc may be used other than Mg-doped $LiNbO_3$. Since $LiNbO_3$ or doped $LiNbO_3$ has a high nonlinear optical constant, highly efficient conversion becomes possible. In addition, a periodical polarization reversal structure of a ferroelectric substance such as $LiTaO_3$, KTP, $KNbO_3$ is also effective for enhancing output power. Since reduction of the power density of a higher harmonic is effective to enhance tolerance to high output, the construction of the present invention is effective.

Further, in the first to the twelfth embodiments, wavelength conversion is especially effective in cases where a wavelength of the fundamental wave is 1200 nm or less as a phase matching wavelength. The occurrence of visible light absorption due to ultraviolet notably takes place when the wavelength of the ultraviolet is 400 nm or less. Therefore, the construction of the present invention is especially effective in a fundamental wave of 1200 nm or less from which a wavelength of 400 nm or less is generated as a sum frequency wave. Further, as an output, it is effective when a second higher harmonic output is above about 1 to 2 W. Further, for a wavelength of 1200 nm or more, the construction of the present invention is effective when generation of second higher harmonic is 10 W or more. Further, for a wavelength of 1200 nm or more, it is effective for second higher harmonic generation of 10 W or more. For a wavelength of 1200 nm or more, similar deterioration in tolerance to high output occurs due to the generation of wavelength light of one-fourth of the wavelength λ of fundamental wave as a quadruple wave of the fundamental wave. However, since the efficiency of the quadruple wave is low, the construction of the present invention is especially effective when the output of a higher harmonic becomes high powered which exceeds 10 W, or when the output of the fundamental wave becomes light of pulse train having a high peak power. The construction of the present invention is effective when the peak power of the fundamental wave becomes 100 $MW/cm^2$ or more because deterioration in tolerance to high output due to the generation of quadruple waves occurs a problem there.

THIRTEENTH EMBODIMENT

FIG. 14(a) is a diagram illustrating a construction of a short wavelength light source according to a thirteenth embodiment of the present invention.

A short wavelength light source 600 according to this thirteenth embodiment comprises a fundamental wave light source 601, a wavelength conversion element 602, and a condenser light source 611. In a short wavelength light source 600, a fundamental wave 608 outputted from the fundamental wave light source 601 is converted into a plurality of higher harmonics by reflecting the fundamental wave in the wavelength conversion element 602 by disposing the fundamental light source 601 with a inclination angle.

Next, operations and effects of the thirteenth embodiment will be described.

In the short wavelength light source 600 having the construction as described above, the fundamental wave 608 that is outputted from the fundamental wave light source 601 enters the optical axis of the polarization reversal structure 604 of the wavelength conversion element 602 with a inclination angle, and is totally reflected by the side face 605 of the wavelength conversion element 602. This reflected portion is made as the reflection portion P hereinafter. In this case, with the reflection portion P as a boundary, a polarization reversal region X3 which is from the incident facet of the wavelength conversion element 602 to the reflection portion P and a polarization reversal region X4 which is from the reflection portion P to the output facet of the wavelength conversion element 602 have angles, as angles between the optical axis of the polarization reversal structures 604 and the fundamental wave 608 in respective regions X3 and X4, which are reverse to each other as positive or negative. That is, with the reflection portion P as a boundary, regions having different cross angles between the polarization reversal structure 604 and the fundamental wave 608 are formed.

As described above, since the fundamental wave 608 and the polarization reversal structure 604 are intersected with having a inclination angle, the fundamental wave 608 and the higher harmonic 607 which is generated at the first-half region (which is region X3 from the incident facet to the reflection portion P) of the wavelength conversion element 602 are reflected at positions different from the reflection portion P of the fundamental wave 608. Therefore, the higher harmonic 606 generated at the later-half region (which is region X4 from the reflection portion P to the output facet) of the wavelength conversion element 602 and the higher harmonic 607 that is generated in the first-half region X3 take different beam paths. As a result, the beams of the higher harmonic 606 and 607 which are generated respectively at the first-half region X3 and the second-half region X4 of the wavelength conversion element 607 do not overlap, thereby the power density of the higher harmonic is decreased. In this way, by reducing the power density of the higher harmonic, it becomes possible to enhance the tolerance to high output.

FOURTEENTH EMBODIMENT

FIG. 14(b) is a diagram illustrating a construction of a short wavelength light source according to a fourteenth embodiment of the present invention.

A short wavelength light source 600a according to this fourteenth embodiment comprises a fundamental light source 601, a wavelength conversion element 602a whose output and incident facets are provided with multi-layered reflection mirrors 609 and 610, and a condenser light source 611. In this light source, a fundamental wave is reflected by the side and facets of the wavelength conversion element, and is wavelength converted at a plurality of beam paths.

The multi-layered reflection mirror 609 transmits a fundamental wave and reflects a higher harmonic. To the contrary, the multi-layered mirror 610 reflects a fundamental wave and transmits a higher harmonic.

Next, operations and effects of the fourteenth embodiment will be described.

When a fundamental wave 612 that is outputted from the light source 601 penetrates the multi-layered mirror 609 and enters the wavelength conversion element 602, the fundamental wave 612 is reflected by the side face 614 of the wavelength conversion element 602, is reflected by the multi-layered reflection mirror 610, and is reflected by the side face 615 of the wavelength conversion element 602, and then, the reflected fundamental wave 612 passes through the multi-layered reflection mirror 609 so as to be emitted to the outside. At that time, the fundamental wave 612 generates higher harmonics at respective beam paths in the wavelength conversion element 602a. Therefore, wavelength conversion can be performed with high efficiency.

By the way, in the short wavelength light source 600a, since the higher harmonic and the fundamental wave have walk-off angles as explained in FIG. 14(a), the beam path of the higher harmonic is shifted every time when they are reflected in the wavelength conversion element 602a. Therefore, the power density of the higher harmonic 613 is lowered and the tolerance to high output is enhanced to a great extent. As a result, a high-output higher harmonic is outputted to the outside through the multi-layered reflection mirror 610. Furthermore, an overlap of the fundamental wave and the higher harmonic is reduced due to the generation of walk-off angles, thereby the generation of the sum frequency waves is suppressed and the tolerance to high output is enhanced.

Meanwhile, in the fourteenth embodiment, although the reflection of the fundamental wave and the higher harmonic is carried out by the side faces of the crystal, it is possible to reflect the fundamental wave and the higher harmonic by the front facet and the back facet of the crystal. In order to make highly efficient conversion possible by establishing a phase matching condition, the fundamental wave 608 and a periodical polarization reversal structure 604 should intersect with each other at the same period in front and back of the reflection portion. In order to do so, vertical properties of the polarization reversal structure 604 and the reflection side surface 605 become important. If the vertical properties are maintained, phase matching conditions in front and back of the reflection portion P become equal, thereby it is possible to realize highly efficient conversion. As a way to secure the vertical properties of the polarization reversal structure 604 and the reflection side surface, it is effective to make a reflection surface to have a crystal surface. When a Z-plate crystal which has the Z axis in a direction vertical to the surface is used, a polarization reversal structure is surely constructed in the vertical direction to the crystal surface. Then, if reflection by the crystal surface is utilized, phase matching conditions in front and back of the reflection portion can be coincided with high accuracy, thereby realizing a highly efficient conversion.

FIFTEENTH EMBODIMENT

Figure 15:
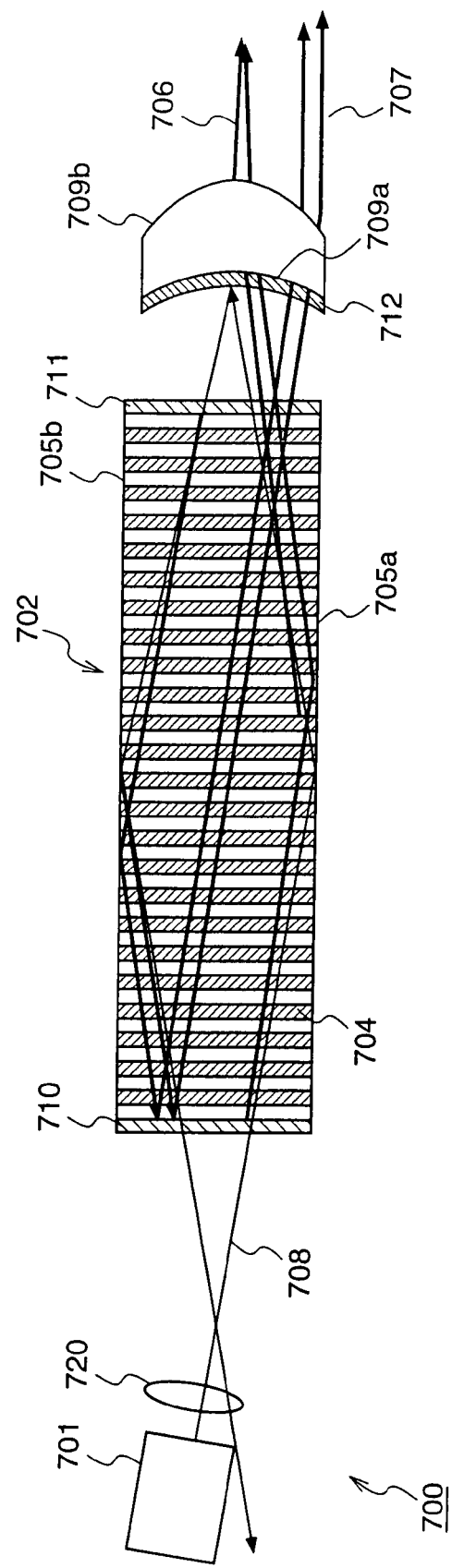
FIG. 15 is a diagram illustrating one example of a construction of a short wavelength light source according to a sixteenth embodiment of the present invention.

FIG. 15 is a diagram illustrating a construction of a short wavelength light source according to a fifteenth embodiment of the present invention.

A short wavelength light source 700 according to this fifteenth embodiment comprises a fundamental light source 701, a wavelength conversion element 702, a condenser light source 720, and a beam shaping means for reflecting only a fundamental wave. The construction of the short wavelength light source 700 is different from that of the short wavelength light source 600a in FIG. 14, in that a multi-layered film 711 formed on the output facet of the wavelength conversion element is with no reflection coating for a fundamental wave and a higher harmonic, and in that the beam shaping means is provided external to the wavelength conversion element.

A multi-layered film 710 for reflecting only a higher harmonic is formed on the incident facet of the wavelength conversion element 702, and the multi-layered film 711 for preventing reflection of a fundamental wave and a higher harmonic is formed on the output facet.

The beam shaping means comprises a concave mirror 709a for reflecting only a fundamental wave and a convex mirror 709b for collecting a higher harmonic which has transmitted through the concave mirror 709b. A multi-layered film 712 as a reflection prevention film which is similar to the multi-layered film 711 is formed on a concave portion of the concave mirror 709a.

Next, operations and effects of the fifteenth embodiment will be described.

In the short wavelength light source 700 having the construction as described above, a fundamental wave 708 that is outputted from the fundamental wave light source 701 is reflected by the side face 705a of the wavelength conversion element 702, and is reflected by the external concave mirror 709a through the multi-layered film 711. A higher harmonic 706 generated before and after the reflection at the side face 705a is collected by the concave lens 709b. Further, the fundamental wave 708 that is reflected by the convex lens mirror 709a enters the wavelength conversion element 702 again, and is reflected by the side face 705b, and is outputted to the outside through the multi-layered film 710. A higher harmonic 707 that is generated before and after the reflection at the side face 705b is outputted to the outside after being reflected with the multi-layered film 710, and is collected by the concave lens 709b. Accordingly, it is possible to suppress the spreading of the beam, thereby it is possible to highly maintain the power density of the fundamental wave, realizing a high efficiency conversion.

SIXTEENTH EMBODIMENT

Figure 16:
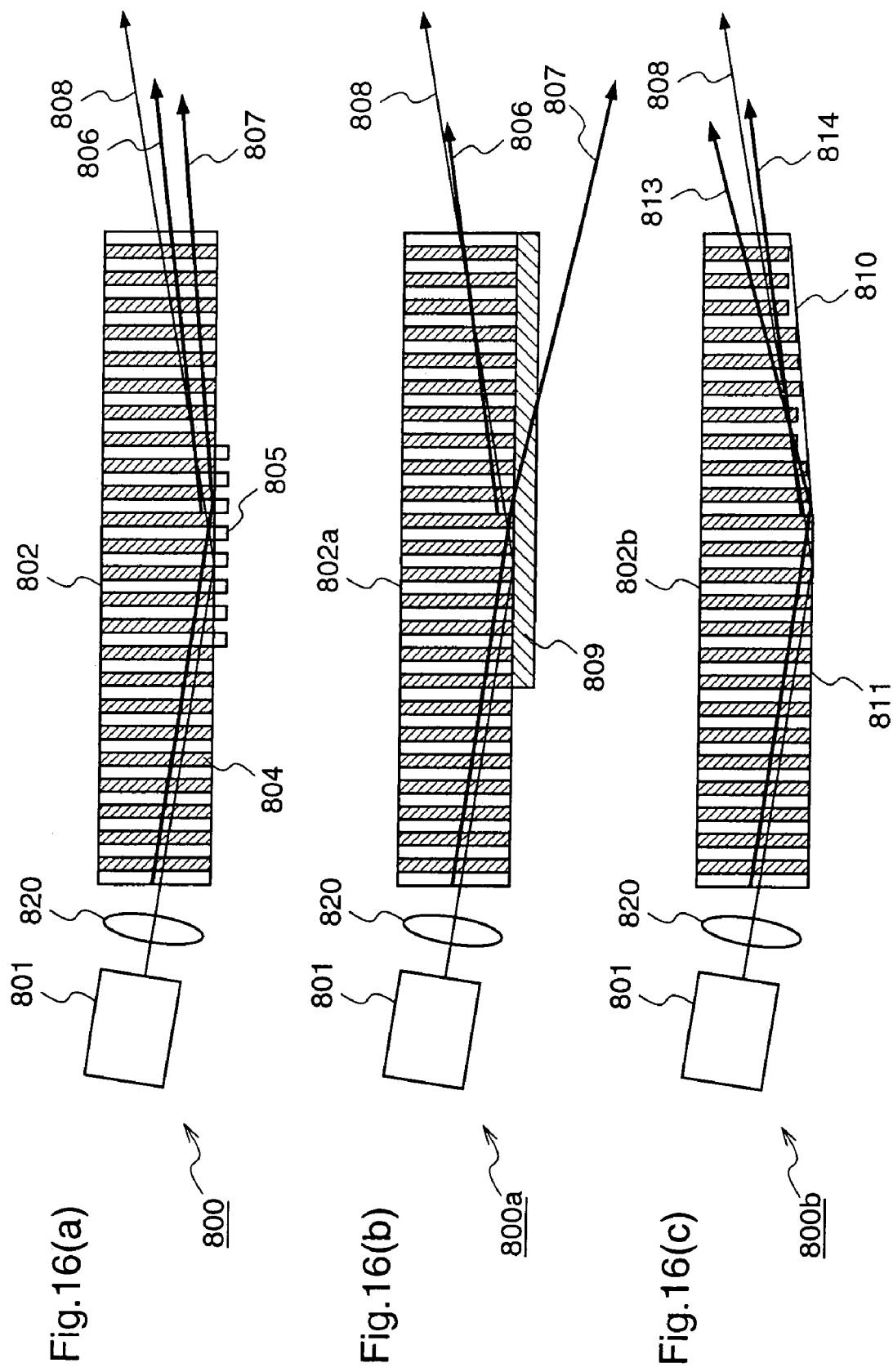
FIG. 16(a) is a diagram illustrating one example of a construction of a short wavelength light source according to a seventeenth embodiment of the present invention.
FIGS. 16(b) and 16(c) are diagrams illustrating another constructional example of a short wavelength light source according to a seventeenth embodiment of the present invention.
Figure 17:
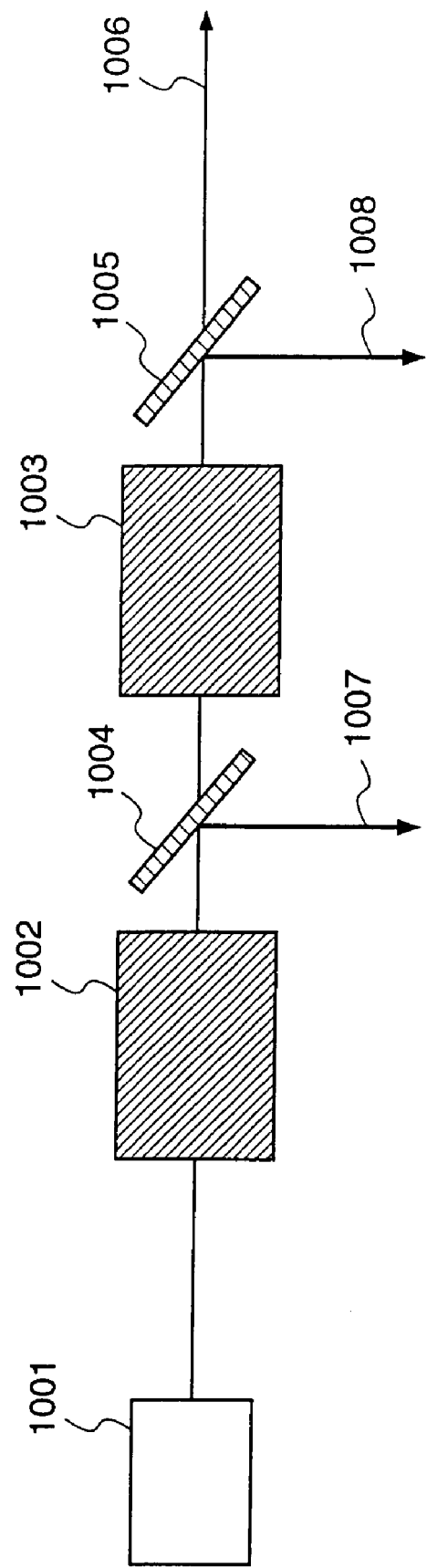
FIG. 17 is a diagram illustrating one example of a construction of a conventional short wavelength light source.

FIG. 16(a) is a diagram illustrating a construction of a short wavelength light source according to a sixteenth embodiment of the present invention.

In this sixteenth embodiment, in addition to a method for separating beam paths by using a walk-off between a fundamental wave and a higher harmonic when reflecting the beam of the fundamental wave by a side face of a wavelength conversion element, a separation angle for separating the fundamental wave and the higher harmonic at the reflection surface is widened.

A short wavelength light source 800 according to this sixteenth embodiment comprises a fundamental wavelength light source 801, a wavelength conversion element 802, and a condenser light source 820. A diffraction element 805 is formed on a reflection surface of the wavelength conversion element 802. This diffraction element 805 is designed so as to generate zero-order diffraction, i.e., specular reflection to a fundamental wave, and higher-order diffraction to a higher harmonic.

Next, operations and effects of the sixteenth embodiment will be explained.

A fundamental wave 808 that is outputted from the fundamental wave light source 801 enters the wavelength conversion element 802 to be reflected by the side face of the wavelength conversion element 802. A higher harmonic 807 generated in the first half of the wavelength conversion element 802 is diffracted by the diffraction element 805 that is formed on the reflection surface of the wavelength conversion element 802. On the other hand, since the fundamental wave 808 is not diffracted by the diffraction element 805, it is totally reflected and a part thereof is converted into a higher harmonic 808. Since the higher harmonic 807 that is generated in the first half of the wavelength conversion element 802 and the higher harmonic 808 that is generated in the second half are generated at different angles, they do not overlap with each other, and thereby the power density of the higher harmonic can be lowered. As a result, tolerance to high output can be enhanced to a great extent.

In this embodiment, although a case where the diffraction element 805 is provided on the side face (that reflects fundamental wave) of the wavelength conversion element 802 is described, a multi-layered film for only reflecting a fundamental wave may be formed thereon. A short wavelength light source 800a which comprises a wavelength conversion element 802a whose reflection surface is provided with a multi-layered film 809 is shown in FIG. 16(b).

The multi-layered film 809 is designed to transmit a higher harmonic and to totally reflect a fundamental wave. Therefore, since a higher harmonic which is generated in the first half of the wavelength conversion element 802a is separated by the multi-layered film 809, it does not overlap with a higher harmonic that is generated in the second half of the wavelength conversion element. Accordingly, the power density of the higher harmonic is lowered, and the tolerance to high output can be enhanced to a great extent.

Furthermore, in this embodiment, a part of the reflection surface can be formed in a tapered shape other than forming a diffraction element thereon. A short wavelength light source 800b which comprises a wavelength conversion element 802b whose reflection surface is partially formed in a taped shape is shown in FIG. 16(c).

In this short wavelength light source 800b, since the fundamental wave 808 is intersected with the polarization reversal structure 804 with a inclination angle in wavelength conversion element 802b, a walk-off is generated and a fundamental wave and a higher harmonic are generated at different angles. Therefore, positions at which a fundamental wave and a higher harmonic are reflected on the side face are different. In FIG. 16(c), since the side face 810 and 811 which reflects the beam are inclined, if the light source is designed so as to reflect a fundamental wave by the side face 811 and to reflect a higher harmonic by the side face 810, the angles between a higher harmonic which is generated in the first half of the wavelength conversion element 802b and a higher harmonic that is generated in the second half can be largely deviated. Therefore, the power density of the higher harmonic can be lowered by separating the higher harmonic into a plurality of beams, and thereby the tolerance to high output can be enhanced.

Meanwhile, highly efficient conversion becomes possible by using a Q-switch pulse light source as a light source. The reason for this is because, even if the average power is low, the highly efficient conversion becomes possible since high peak power of fundamental wave can be used. A frequency higher than 1 kHz is preferable as a repetition frequency. When the frequency is less than 1 kHz, the peak power of fundamental wave becomes high and when the power density becomes about 100 MW/cm$^2$, crystal failure due to laser damages takes place. It is required to increase the size of a beam spot of light and to lower the average power. In order to use the short wavelength light source as a high output light source, it is preferable that a repetition frequency is higher than 1 kHz, and more preferably higher than 10 kHz.

Further, Nd material such as Nd:YVO4, Nd:YAG, and Nd:glass or Yb-doped material such as yb:YAG, and Yb:glass can be applied for the light source. Further, it is possible to use a Yb-doped fiber laser. A fiber laser which is easy in increasing its output, is excellent in light collection characteristics due to its high beam quality, and thereby a highly effective conversion is possible.

Further, as PPMgLN in the present invention, Mg5 mol % doped PPMgLN is used. As a dope amount of Mg, from 4.9 mol % to 6 mol % is desirable. And more desirably, doping of 5.6±0.2 mol is desirable because it excels in light resistant damage strength.

In addition, PPMgLn doped with Zn, In, or SC can be similarly used. PPMgLN which has a stoichiometric composition can be also used because it is a high nonlinear material which excels in light resistant damage strength. In this case, it is preferable that a dope amount of Mg is more than 1.5 mol %. In addition, the construction of the present invention is effective for Mg-doped LiTaO$_3$, Mg-doped stoichiometric LiTaO$_3$, KTP, or the like.

INDUSTRIAL APPLICABILITY

Since the short wavelength light source of the present invention is capable of drastically enhancing tolerance to high output and realizing a stable and highly reliable short wavelength light source, it can be used as a high power visible light source using a wavelength conversion element.

The invention claimed is:

1. A short wavelength light source comprising:
a fundamental wave light source for outputting a fundamental wave; and
a nonlinear optical crystal for converting a part of the fundamental wave into a second higher harmonic, said nonlinear optical crystal having a periodical polarization reversal structure,
wherein, the polarization reversal structure of said nonlinear optical crystal includes at least a first polarization reversal region and a second polarization reversal region, wherein the light path of a second higher harmonic generated from the first polarization reversal region is different from the light path of a second higher harmonic generated from the second polarization reversal region, and the light paths of second higher harmonics generated from respective polarization reversal regions, are different from the optical paths of fundamental waves entering said respective polarization reversal regions.

2. The short wavelength light source as defined in claim 1, wherein an angle formed by at least either the optical axis of the fundamental wave or the optical axis of the second higher harmonic and the optical axis of period of the polarization reversal structure is different in the respective polarization reversal regions.

3. The short wavelength light source as defined in claim 2, wherein the plurality of polarization reversal regions are divided by lines that are parallel to the optical axis of the fundamental wave.

4. The short wavelength light source as defined in claim 2, wherein the plurality of polarization reversal regions are aligned in order in a direction parallel to the optical axis of the fundamental wave.

5. The short wavelength light source as defined in claim 2, wherein an angle formed by the optical axis of each polarization reversal structure and the optical axis of the fundamental wave is different in the respective polarization reversal regions.

6. The short wavelength light source as defined in claim 2, wherein said nonlinear optical crystal has a side face which is virtually horizontal to the polarization reversal structure, and reflects the fundamental wave by the side face.

7. The short wavelength light source as defined in claim 2, wherein the positive and negative of the angle formed by the optical axis of periods of each polarization reversal structure and the optical axis of the fundamental wave are opposite in adjacent regions among the plurality of polarization reversal regions.

8. The short wavelength light source as defined in claim 2, wherein an angle formed by either the optical axis of the fundamental wave or the optical axis of the second higher harmonic and the optical axis of period of the polarization reversal structure is more than two degrees.

9. The short wavelength light source as defined in claim 2, wherein said nonlinear optical crystal is Mg-doped LiNbO$_3$.

10. The short wavelength light source as defined in claim 2 including a light polarization plate for rotating the light polarization of the second higher harmonic.

11. The short wavelength light source as defined in claim 1, wherein the polarization reversal structure includes left and right regions relative to the optical axis of the fundamental wave.

12. The short wavelength light source as defined in claim 11, wherein the left and right regions of the polarization reversal structure comprise a wedge shape.

13. The short wavelength light source as defined in claim 11, wherein the left and right regions of the polarization reversal structure are curved.

14. The short wavelength light source as defined in claim 1, wherein an angle of an optical path of the period of the first polarization reversal structure is different from an angle of an optical path of the period of the second polarization reversal structure.

15. The short wavelength light source as defined in claim 1, wherein an angle between an optical path of a fundamental wave entering the first respective polarization reversal region and an optical path of the period of the first polarization reversal structure is different from an angle between an optical path of the fundamental wave entering the second respective polarization reversal region and an optical path of the period of the second polarization reversal structure.

* * * * *